(12) United States Patent
Cecur et al.

(10) Patent No.: US 11,781,452 B2
(45) Date of Patent: Oct. 10, 2023

(54) VALVE TRAIN ASSEMBLY

(71) Applicant: Eaton Intelligent Power Limited, Dublin (IE)

(72) Inventors: Majo Cecur, Rivarolo Canavese (IT); Andrei Radulescu, Marshall, MI (US); Michael J. Campbell, Jackson, MI (US); Mark Van Wingerden, Battle Creek, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/064,497

(22) Filed: Dec. 12, 2022

(65) Prior Publication Data

US 2023/0160324 A1 May 25, 2023

Related U.S. Application Data

(63) Continuation of application No. 17/328,138, filed on May 24, 2021, now Pat. No. 11,536,168, which is a continuation of application No. PCT/EP2019/083085, filed on Nov. 29, 2019.

(60) Provisional application No. 62/811,251, filed on Feb. 27, 2019, provisional application No. 62/780,983, (Continued)

(51) Int. Cl.
| | |
|---|---|
| *F01L 13/06* | (2006.01) |
| *F01L 1/46* | (2006.01) |
| *F01L 13/00* | (2006.01) |
| *F01L 1/26* | (2006.01) |

(Continued)

(52) U.S. Cl.
CPC .............. *F01L 13/06* (2013.01); *F01L 1/267* (2013.01); *F01L 1/46* (2013.01); *F01L 13/0005* (2013.01); *F01L 1/185* (2013.01); *F01L 1/2405* (2013.01); *F01L 2001/467* (2013.01);
(Continued)

(58) Field of Classification Search
CPC ......... F01L 1/185; F01L 1/2405; F01L 1/267; F01L 2001/467; F01L 13/0005; F01L 2013/001; F01L 13/06; F01L 2013/101; F01L 2820/031
USPC ........... 123/90.16, 90.4, 90.43, 90.44, 90.45, 123/90.46
See application file for complete search history.

(56) References Cited

U.S. PATENT DOCUMENTS 5,685,264 A * 11/1997 Allen .................. F01L 13/0005
123/90.22
2009/0145389 A1* 6/2009 Choi ...................... F01L 1/267
123/90.45
(Continued)

*Primary Examiner* — Jorge L Leon, Jr.
(74) *Attorney, Agent, or Firm* — Baker Botts L.L.P.

(57) ABSTRACT

A type II valve train assembly that selectively opens first and second intake valves and first and second exhaust valves is provided. The valve train assembly includes an intake rocker arm assembly and an exhaust rocker arm assembly. The valve train assembly is configurable for operation in any combination of activated and deactivated states of engine braking and cylinder deactivation. The exhaust rocker arm assembly includes a first exhaust rocker arm, a second exhaust rocker arm and an engine brake exhaust rocker arm. A first exhaust HLA is associated with the first exhaust rocker arm. A second exhaust HLA is associated with the second exhaust valve. An exhaust actuation assembly selectively actuates to alter travel of the first and second exhaust HLA's to change a state of cylinder deactivation between activated and deactivated.

9 Claims, 19 Drawing Sheets

Related U.S. Application Data filed on Dec. 18, 2018, provisional application No. 62/773,804, filed on Nov. 30, 2018.

(51) Int. Cl.
*F01L 1/24* (2006.01)
*F01L 1/18* (2006.01)

(52) U.S. Cl.
CPC ... *F01L 2013/001* (2013.01); *F01L 2013/101* (2013.01); *F01L 2820/031* (2013.01)

(56) References Cited

U.S. PATENT DOCUMENTS

2017/0321575 A1* 11/2017 Wetzel .................. F01L 1/2405
2019/0360362 A1* 11/2019 Cecil ....................... F01L 13/06

* cited by examiner

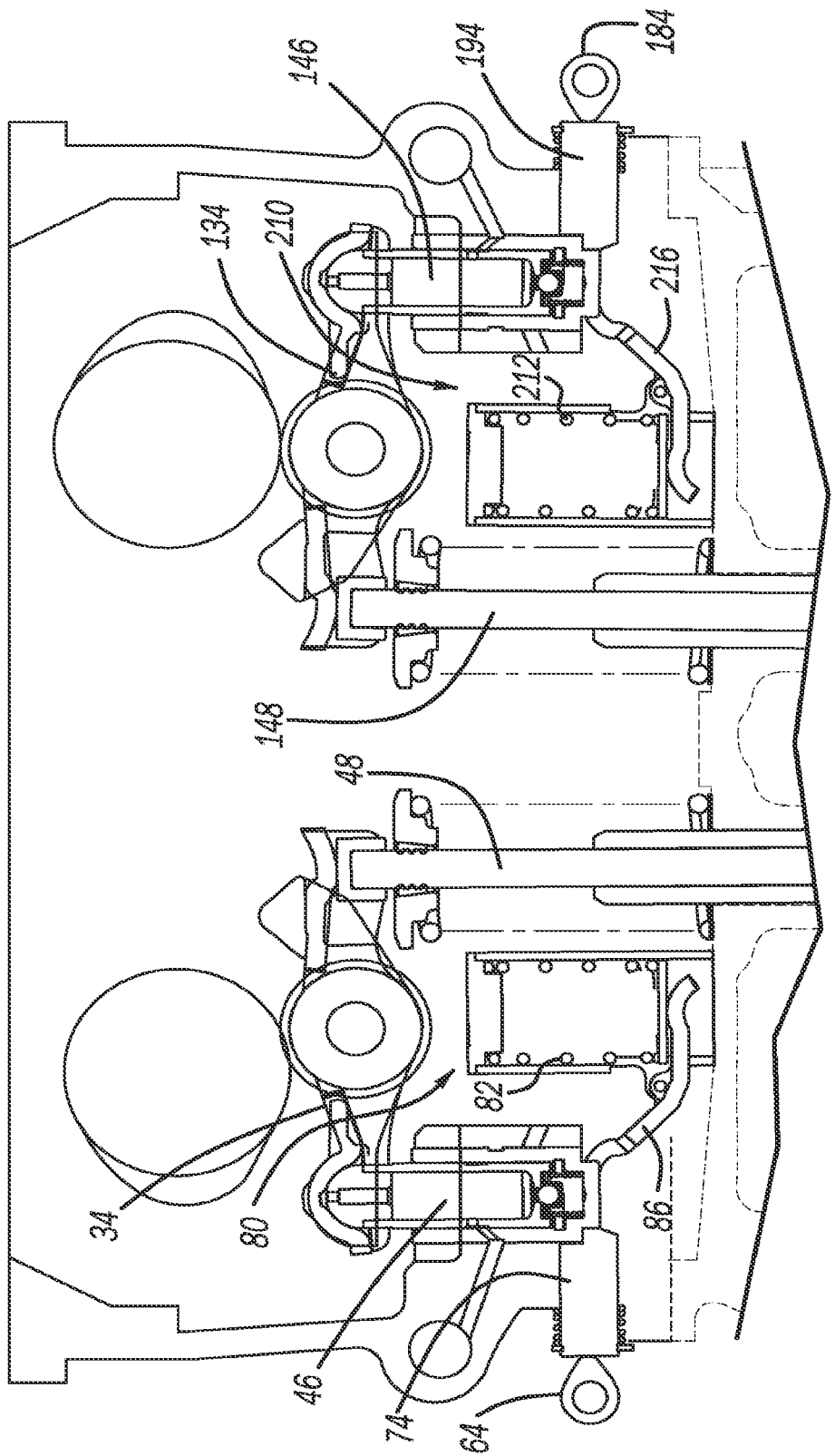

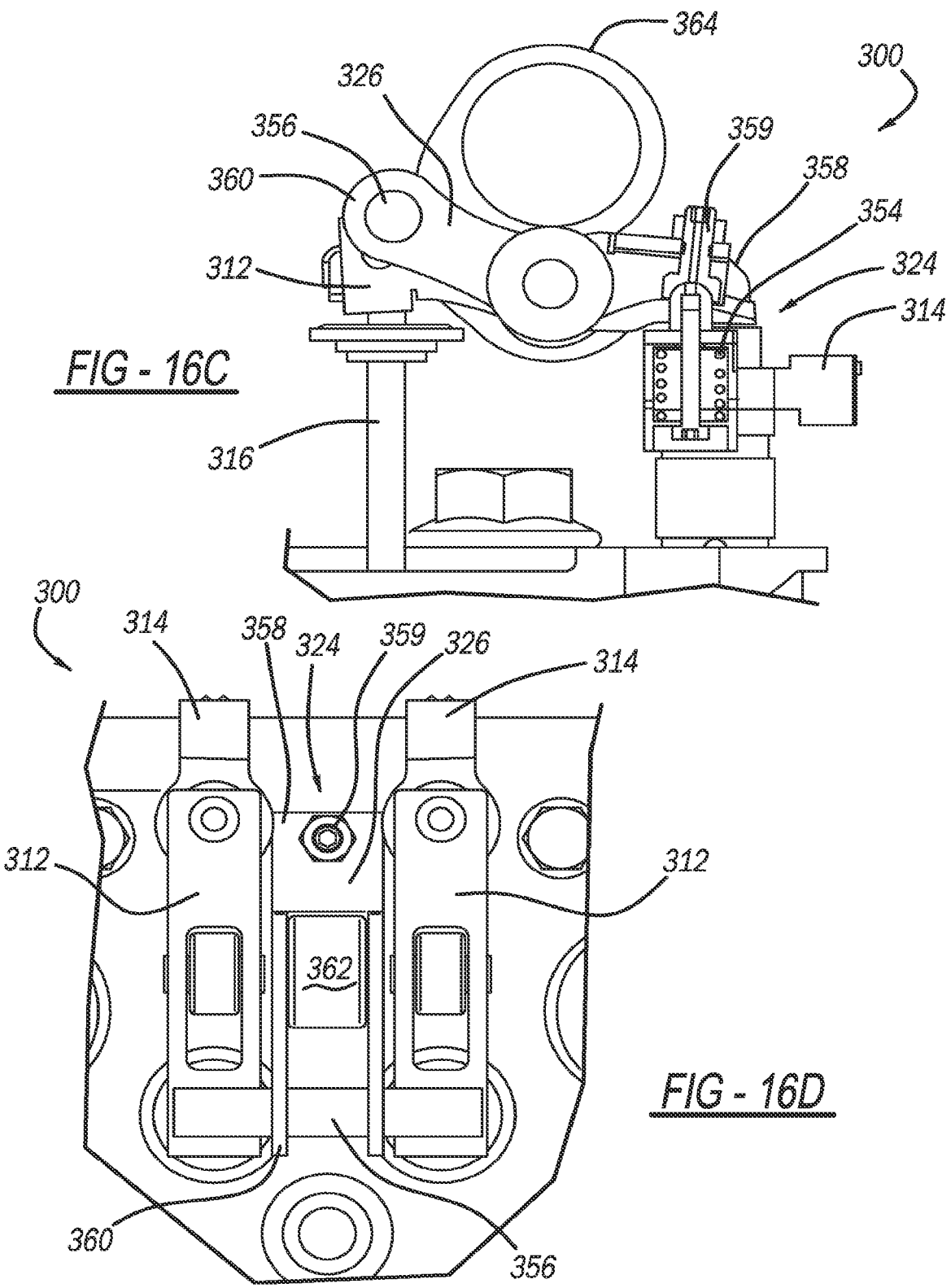

VALVE TRAIN ASSEMBLY

CROSS-REFERENCE TO RELATED APPLICATIONS

This application is a continuation under 35 U.S.C. § 120 of U.S. patent application Ser. No. 17/328,138, filed May 24, 2021, which is continuation and claims the benefit under 35 U.S.C. § 365(c) of International Patent Application No. PCT/EP2019/083085, filed Nov. 29, 2019, which claims the benefit of U.S. Provisional Patent Application No. 62/773,804 filed Nov. 30, 2018, U.S. Provisional Patent Application No. 62/780,983 filed Dec. 18, 2018, and U.S. Provisional Patent Application No. 62/811,251 filed Feb. 27, 2019. The disclosures of each of these applications are incorporated herein by reference.

FIELD

The present disclosure relates generally to a valve train assembly and, more particularly, to a Type II valve train assembly that can be configurable to employ various operational features such as cylinder deactivation and/or engine braking.

BACKGROUND

Some internal combustion engines can utilize rocker arms to transfer rotational motion of cams to linear motion appropriate for opening and closing engine valves. Deactivating rocker arms incorporate mechanisms that allow for selective activation and deactivation of the rocker arm. In a deactivated state, the rocker arm may exhibit lost motion movement. However, conventional valve train carrier assemblies must be often modified to provide a deactivating rocker arm function, which can increase cost and complexity. Similarly, valve trains can be configured to incorporate engine brake function. Engine braking can be provided to provide an additional opening of an engine cylinder's exhaust valve when the piston in that cylinder is near a top-dead-center position of its compression stroke so that compressed air can be released through the exhaust valve. Accordingly, while conventional valve train offerings work for their intended purpose, there remains a need for an improved valve train assembly. For example, it would be desirable to provide a valve train assembly solution for a Type II valve train that is able to selectively provide multiple functionalities including cylinder deactivation and engine brake while also being acceptable for a wide range of engine blocks and valve train carriers.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A type II valve train assembly that selectively opens first and second intake valves and first and second exhaust valves is provided. The valve train assembly includes an intake rocker arm assembly and an exhaust rocker arm assembly. The valve train assembly is configurable for operation in any combination of activated and deactivated states of engine braking and cylinder deactivation.

The intake rocker arm assembly includes a first intake rocker arm, a second intake rocker arm and an engine brake intake rocker arm. A first intake hydraulic lash adjuster HLA is associated with the first intake valve. A second intake HLA is associated with the second intake valve. An intake actuation assembly selectively actuates to alter travel of the first and second intake HLA's to change a state of cylinder deactivation between activated and deactivated.

The exhaust rocker arm assembly includes a first exhaust rocker arm, a second exhaust rocker arm and an engine brake exhaust rocker arm. A first exhaust HLA is associated with the first exhaust rocker arm. A second exhaust HLA is associated with the second exhaust valve. An exhaust actuation assembly selectively actuates to alter travel of the first and second exhaust HLA's to change a state of cylinder deactivation between activated and deactivated.

According to other features, a third intake HLA selectively cooperates with the engine brake intake rocker arm. The intake actuation assembly selectively actuates to alter travel of the third intake HLA to change a state of Miller cycle between activated and deactivated. An engine brake capsule assembly can cooperate with the engine brake exhaust rocker arm. The engine brake capsule moves between expanded and collapsed positions dependent upon an activated and deactivated state of engine braking. The engine brake capsule influences the engine brake exhaust rocker arm to open the first and second exhaust valves in the expanded position.

According to other features, the exhaust actuation assembly further comprises a first latch pin, a first cam, a second latch pin and a second cam. The first latch pin selectively engages the first exhaust HLA. The first cam rotates to influence movement of the first latch pin between extended and retracted positions. The second latch pin selectively engages the second exhaust HLA. A second cam rotates to influence movement of the second latch pin between extended and retracted positions.

In other features, a lever and a lost motion spring assembly is associated with the first exhaust HLA. The lost motion spring assembly is configured to compress upon rotation of the lever subsequent to movement of the first latch pin to the retracted position. A lost motion device can be associated with the exhaust engine brake rocker arm. The lost motion device can include a piston and a biasing member that biases a roller associated with the exhaust brake rocker arm toward an engine brake cam. A mechanical lash adjustment feature can be configured for cooperation with the engine brake exhaust rocker arm. The mechanical lash adjustment feature can comprise a threaded bolt and nut that allows for mechanical lash adjustment that acts on both of the first and second exhaust rocker arms to adjust lash.

In other features, the intake actuation assembly is electromechanically actuated. The exhaust actuation assembly can be electromechanically actuated. The first and second exhaust rocker arms can be formed of stamped metal. The engine brake exhaust rocker arm can define a pair of apertures that receive a pin. The pin can engage both of the first and second exhaust rocker arms and impart motion on the first and second rocker arms based on actuation of the engine brake exhaust rocker arm to open the first and second exhaust valves. At least one of the intake and exhaust actuation assemblies can comprise an electronic latch.

BRIEF DESCRIPTION OF THE DRAWINGS

The present disclosure will become more fully understood from the detailed description and the accompanying drawings, wherein:

FIG. 15 is a cross-sectional view of the exhaust valve assembly of FIG. 1A and shown taken through a lost motion assembly used on an exhaust rocker arm and through a lost motion assembly used on an intake rocker arm;

FIG. 16C is a cross-sectional view of the valve train assembly of FIG. 16A taken along lines 16O-16O;

FIG. 16D is a plan view of the valve train assembly of FIG. 16A;

DETAILED DESCRIPTION

Figure 1A:
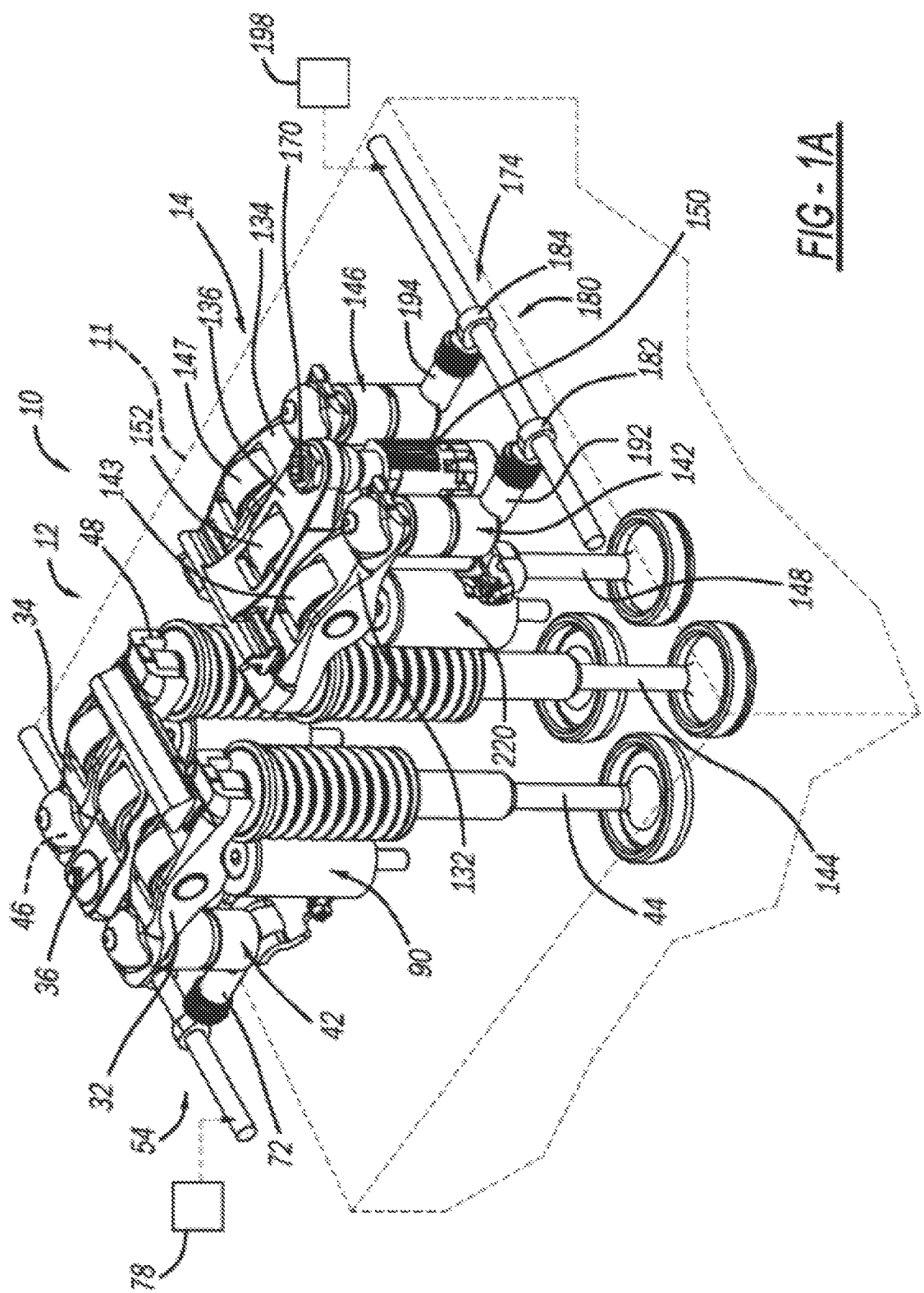
FIG. 1A is a first perspective view of a valve train assembly constructed in accordance to one example of the present disclosure.

The following discussion provides a Type II valve train solution for diesel engine that provides a variety of operating functionalities including cylinder deactivation and engine brake. As will become appreciated from the following discussion, the valve train provided herein allows a customer to choose various operating functions on the same valve train for a Type II light duty and medium duty valve train. In the partial valve train example shown in FIG. 1, a valve train assembly 10 includes an intake valve train assembly 12 and an exhaust valve train assembly 14. The intake valve assembly 12 includes components suitable for operation with cylinder deactivation and Miller cycle (that could be used for i-EGR) using electromechanical actuation. Similarly, as shown in FIG. 1, the exhaust valve train assembly 14 includes components suitable for operation with cylinder deactivation and engine brake using electromechanical actuation.

As will become appreciated herein, the intake and exhaust valve train assemblies 12 and 14 can fulfill a wide range of customer operational requirements while using a common valve train offering 10 that is suitable for acceptance on a wide range of engine blocks and valve train carriers. In this regard, maximum flexibility can be provided to various customers to select what valve functions are important for various applications while using the same valve train offering 10 that mates with a given valve train carrier. In this way, a customer can determine which functions are important to employ, such as but not limited to any combinations of, normally open lash adjuster (NOLA), Miller cycle, engine brake, standard lift, etc. as all of these functions are available in the valve train assembly 10. As such, the same valve train 10 can be similarly suitable for a customer who wants to employ only one function (such as engine brake) or wants to employ more than one of the above operating functions. In the description herein, each of these functions (engine brake, cylinder deactivation, Miller cycle, etc.) are all selectively operational between "activated" and "deactivated" states.

Figure 1B:
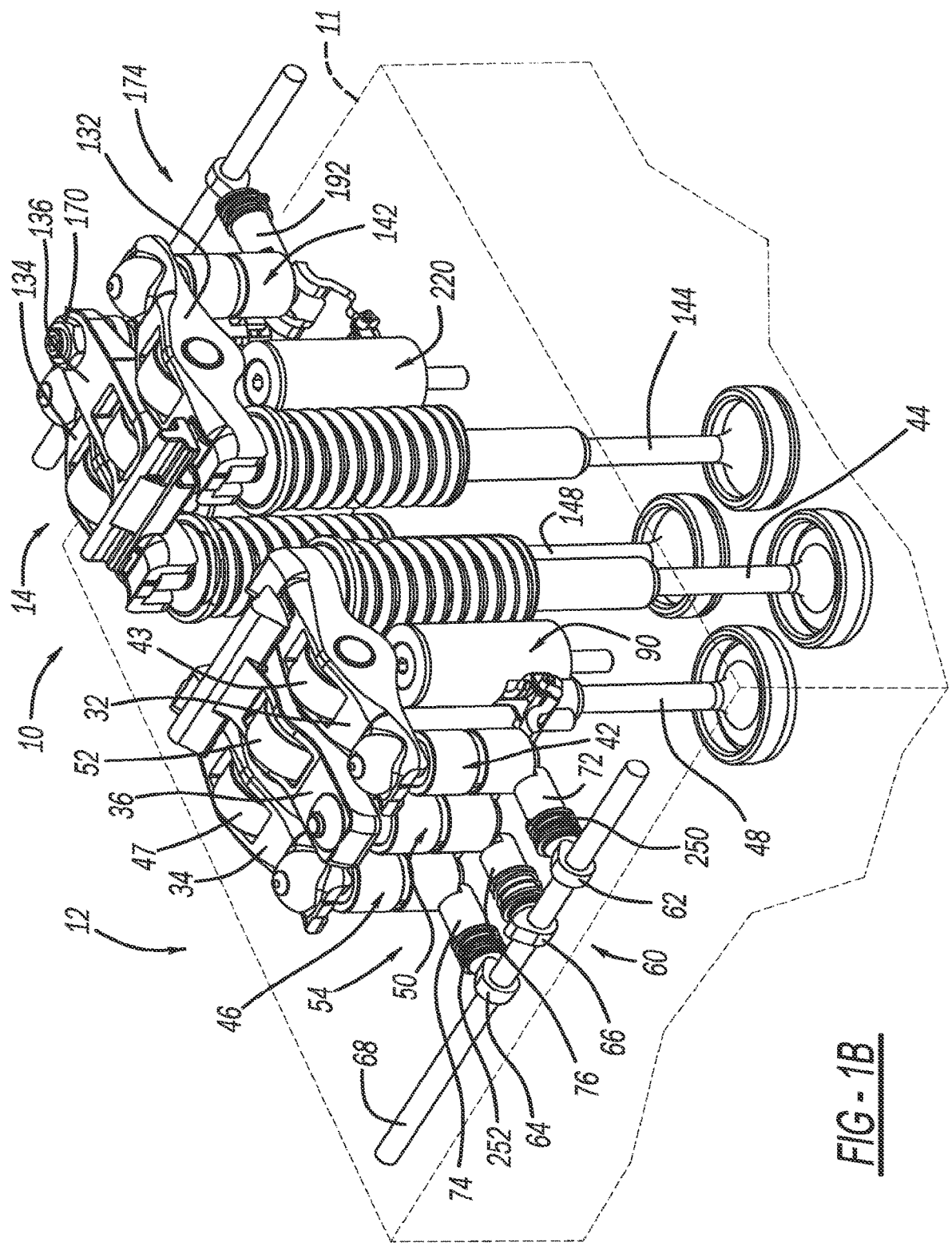
FIG. 1B is a second perspective view of the valve train assembly of FIG. 1A.
Figure 2:
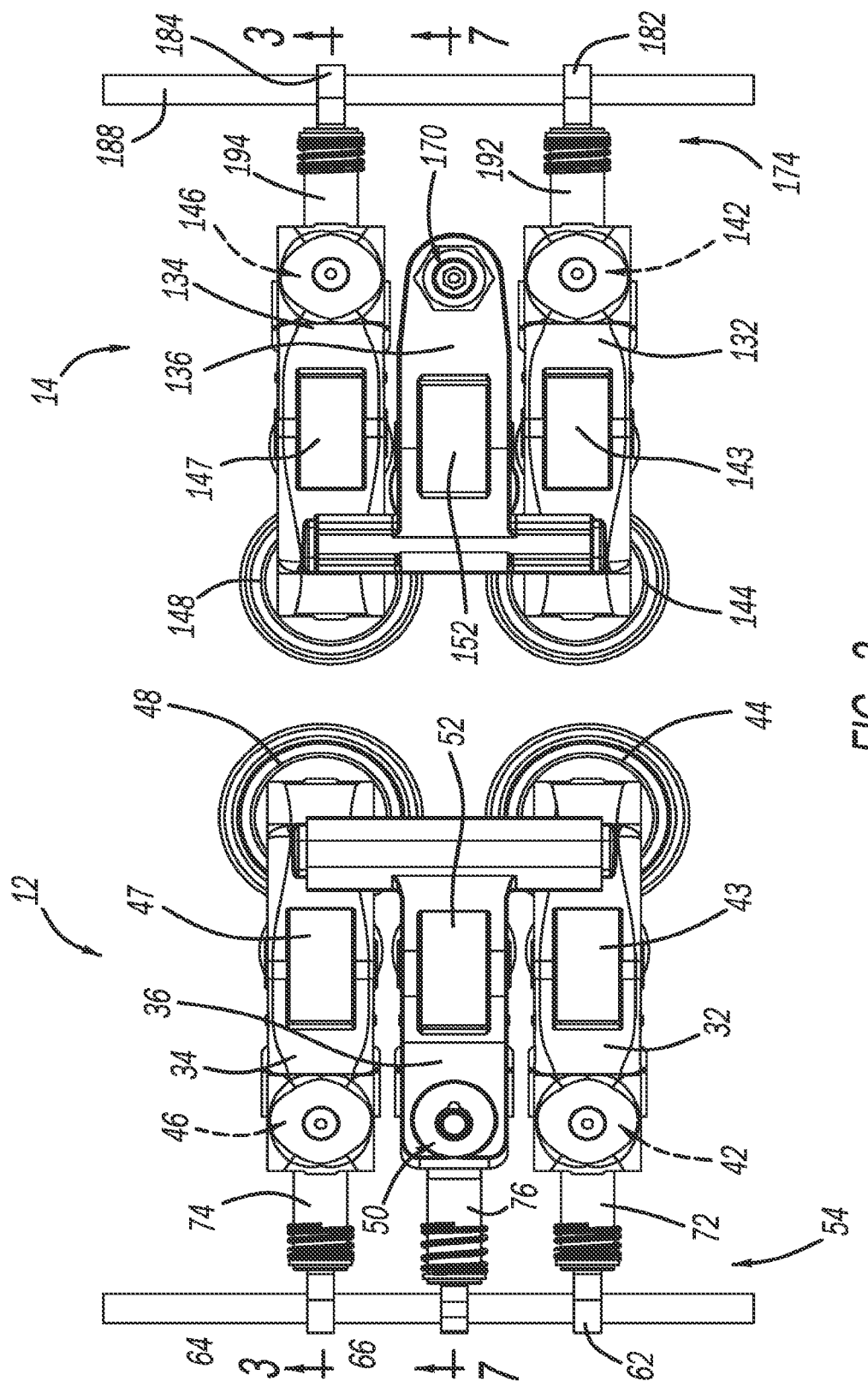
FIG. 2 is a plan view of the valve train assembly of FIG. 1.
Figure 12:
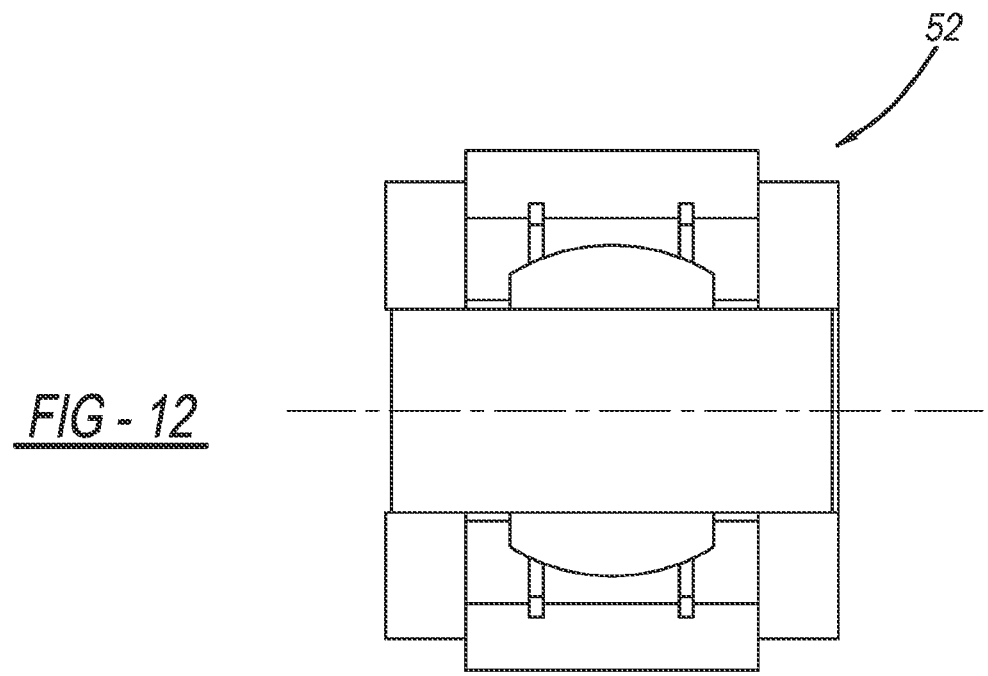
FIG. 12 is a sectional view taken through a spherical (tilting) sliding roller of the engine brake rocker arm assembly of FIG. 11.
Figure 13:
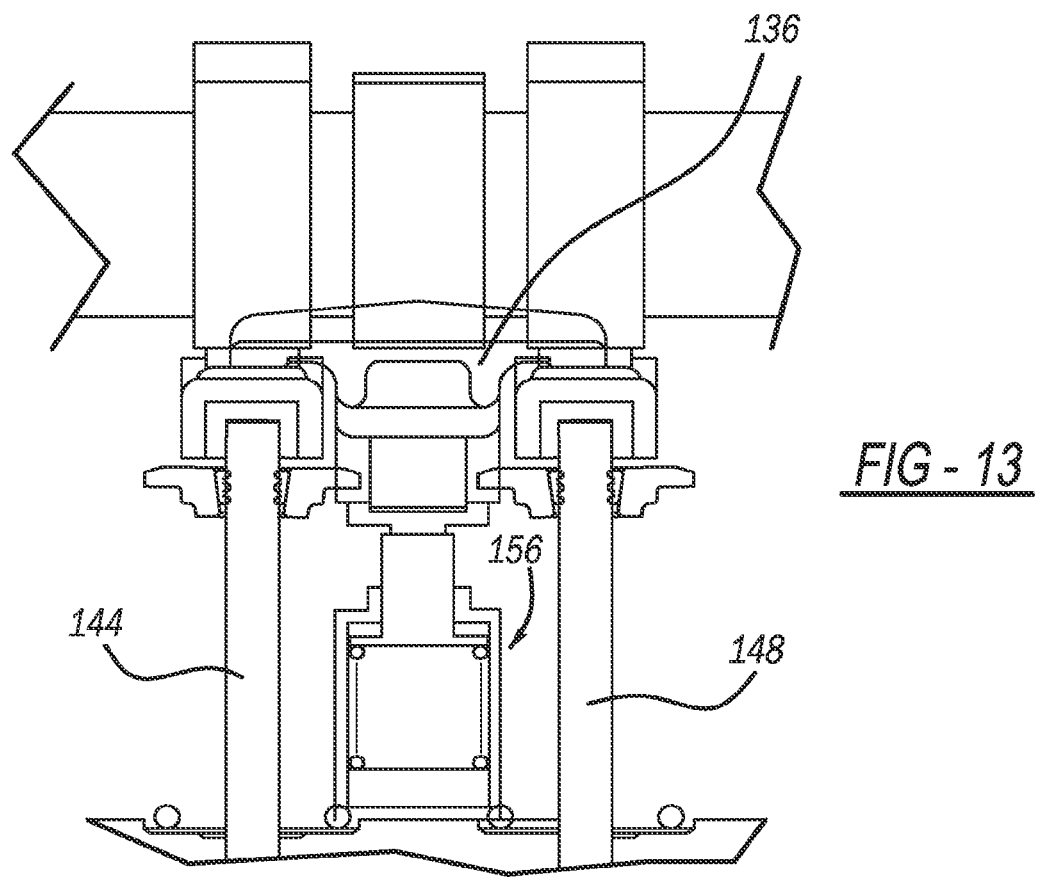
FIG. 13 is a front view of the exhaust valve assembly of FIG. 1A and shown with an exemplary cam assembly.
Figure 14:
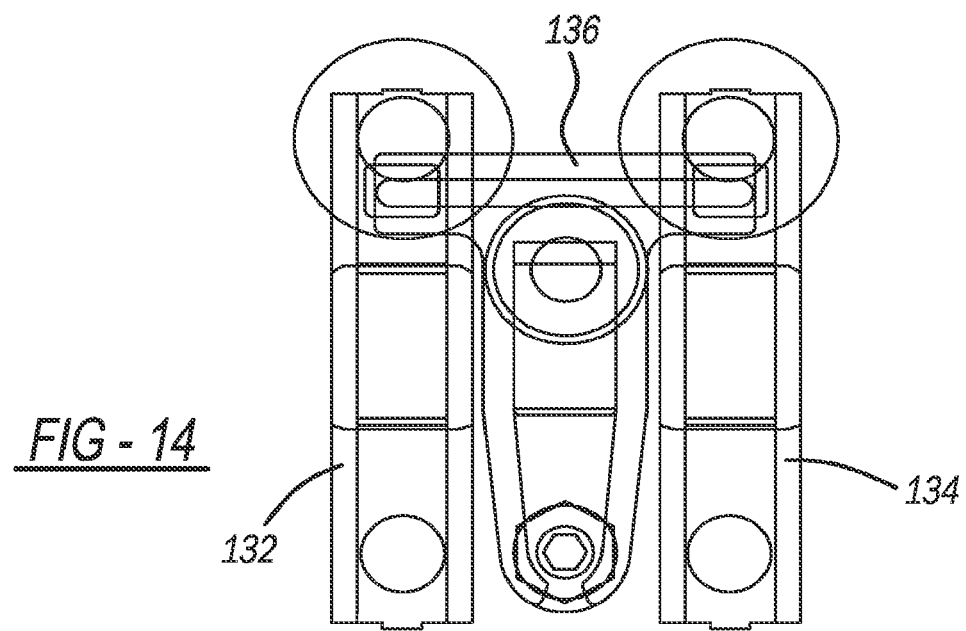
FIG. 14 is a top view of the exhaust valve assembly of FIG. 1A.

With particular reference to FIGS. 1A-2, a valve train arrangement 10 is shown positioned on a cylinder block 11. It will be appreciated that the present disclosure for the various features described herein may be used in various other valve train arrangements. In this regard, the features described herein associated with the valve train arrangement 10 can be suitable to a wide variety of other applications. The intake valve train assembly 12 can generally include a first intake rocker arm 32, a second intake rocker arm 34 and an engine brake rocker arm 36. The first intake rocker arm 32 includes a first end that pivots over a deactivating HLA capsule 42, an intermediate portion having a roller 43 and a second end that actuates a first intake valve 44. The second intake rocker arm 34 includes a first end that pivots over a deactivating HLA capsule 46, an intermediate portion having a roller 47 and a second end that actuates a second intake valve 48. The intake side engine brake rocker arm 36 includes a first end that pivots over a deactivating HLA capsule 50 and an intermediate portion having a roller 52. As will be described in greater detail herein, the roller 52 can include a spherical sliding roller bearing (FIG. 12). A second end of the intake side engine brake rocker arm 36 engages both second ends of the intake rocker arms 32, 34 for concurrently actuating both of the intake rocker arms 32 and 34.

The intake valve train assembly 12 further includes an intake actuation assembly 54. In the example shown, the intake actuation assembly 54 includes a cam assembly 60 having cams 62, 64 and 66 fixed to a camshaft 68 that respectively actuate respective latch pins 72, 74 and 76. As will be described herein, the latch pins 72, 74 and 76 move from unactuated positions to actuated positions to preclude and permit expansion of the HLA's 42, 46 and 50. The intake actuation assembly 54 can be an electromechanical actuation assembly that is actuated by an actuation device 78 (FIG. 1A). In other examples, the intake actuation assembly can be configured differently. For example, the intake actuation assembly can alternatively include an electronic latch (e-latch) having a solenoid on a latch pin coupled to a deactivating lash adjuster. In some arrangements, an e-latch can be accommodated successfully in reduced packaging constraints.

With continued reference to FIGS. 1A-2 and additional reference to FIGS. 3-8, additional features of the instant application will be described. A lost motion spring assembly 80 includes a biasing member 82 that biases a lever arm 86 that extends generally between the lost motion spring assembly 80 and the HLA 46. In the valve train assembly 10 described herein, each of the rocker arms 32 and 34 (on the intake side) as well as rocker arms 132 and 134 (on the exhaust side) are configured with a lost motion spring assembly. Returning now to the description of the lost motion spring assembly 80 in FIG. 3, further description will be made with the understanding that the lost motion spring assemblies associated with the rocker arms 32, 132 and 134 operate similarly. When the cam 64 rotates to a position to allow the latch pin 74 to retract, the HLA 46 is permitted to move downwardly thereby rotating the lever arm 86 and compressing the spring 82 of the lost motion spring assembly 80. While not specifically described herein, it will be appreciated that the rocker arm 32 also communicates with a lost motion spring assembly 90 (FIG. 1B) that provides the same functionality as the lost motion spring assembly 80 but for the rocker arm 32.

Returning to FIGS. 1A-2, the exhaust valve train assembly 14 can generally include a first exhaust rocker arm 132, a second exhaust rocker arm 134 and an engine brake rocker arm 136. The first exhaust rocker arm 132 includes a first end that pivots over a deactivating HLA capsule 142, an intermediate portion having a roller 143 and a second end that actuates a first exhaust valve 144. The second exhaust rocker arm 134 includes a first end that pivots over a deactivating HLA capsule 146, an intermediate portion having a roller 147 and a second end that actuates a second exhaust valve 148. The exhaust side engine brake rocker arm 136 includes a first end that pivots over an engine brake castellation type capsule assembly 150 (FIG. 1A) and an intermediate portion having a roller 152.

Figure 7:
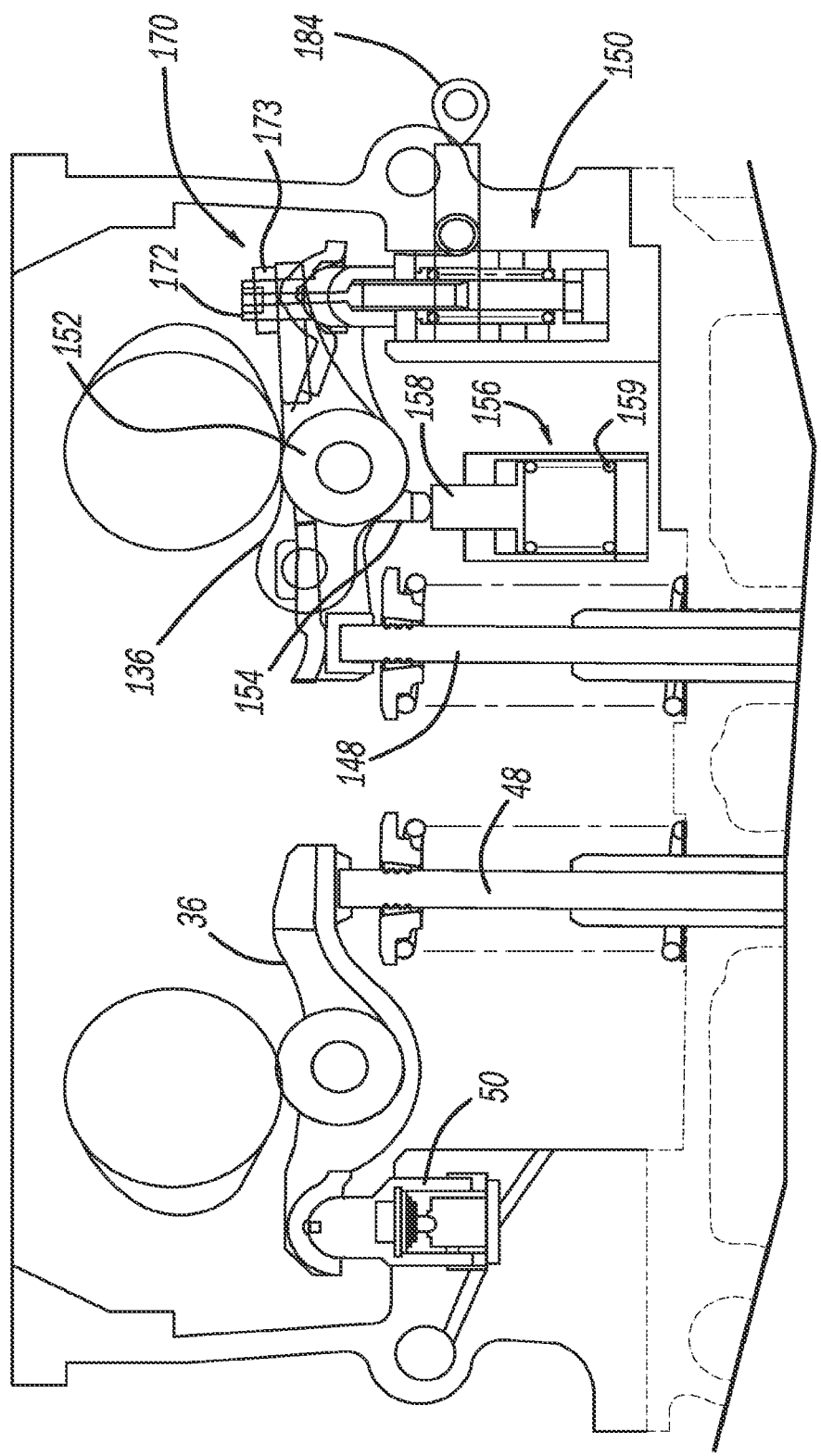
FIG. 7 is a sectional view of the valve train assembly of FIG. 2 taken along lines 7-7 and shown during decompression engine brake and during maximum engine brake lift.
Figure 8:
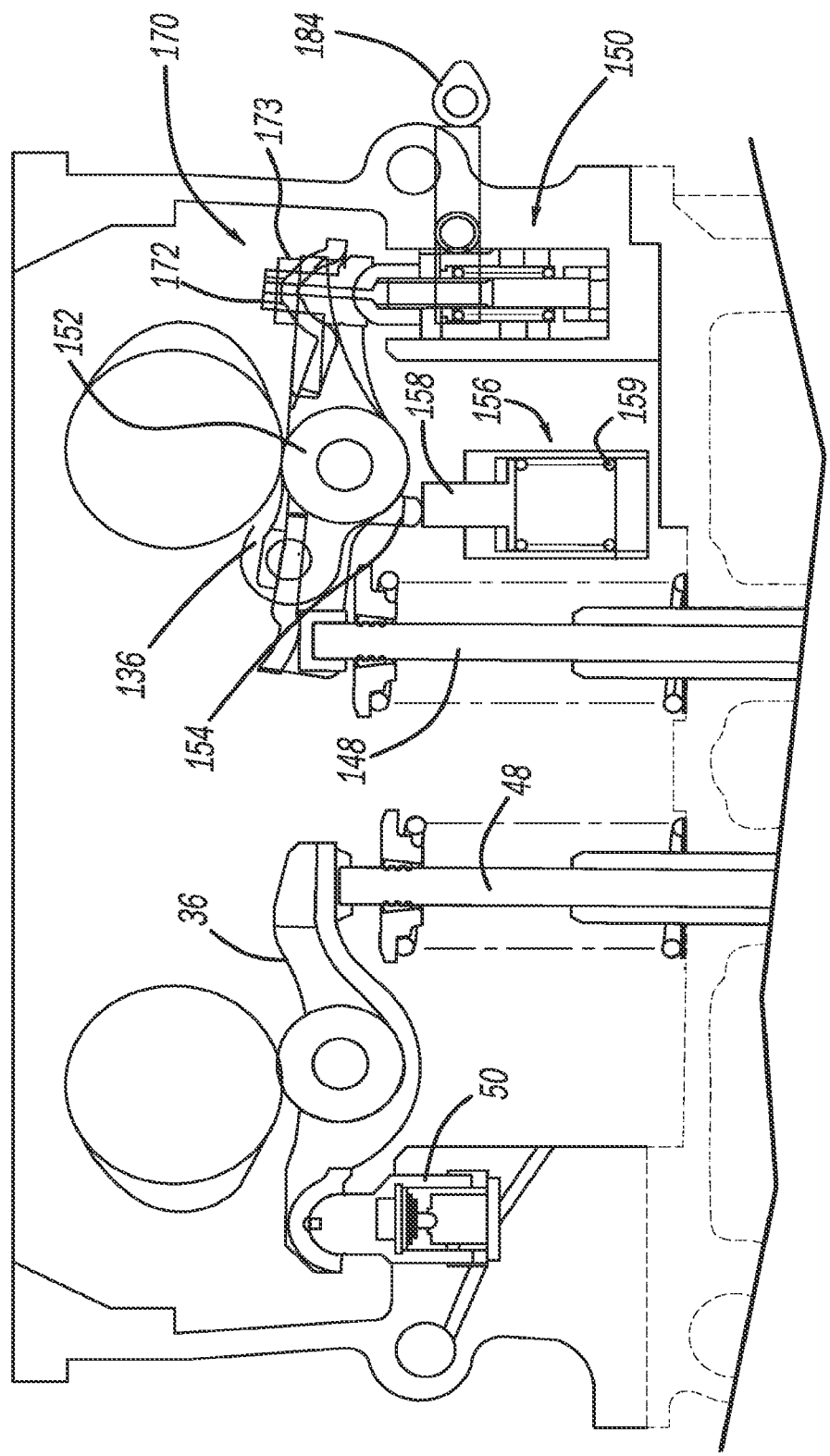
FIG. 8 is a sectional view of the valve train assembly of FIG. 7 and shown with the engine brake rocker arm at maximum lost motion and during drive mode.
Figure 9:
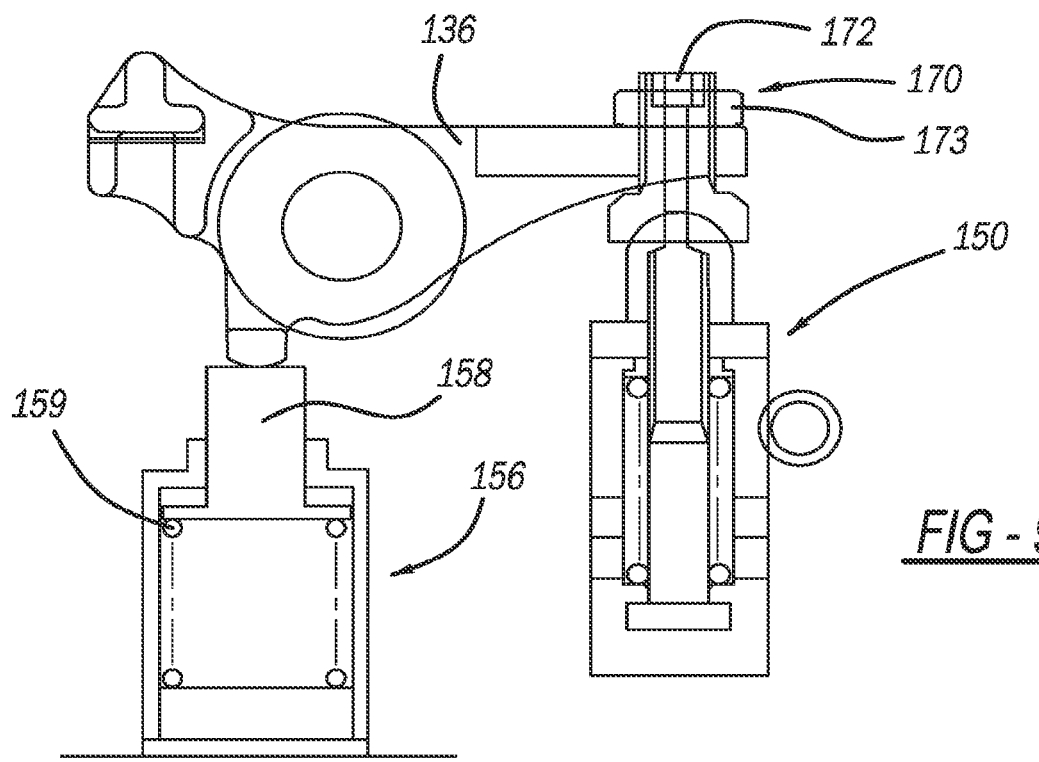
FIG. 9 is a sectional view of the valve train assembly of FIG. 2 taken along lines 9-9 through the engine brake rocker arm assembly.
Figure 10:
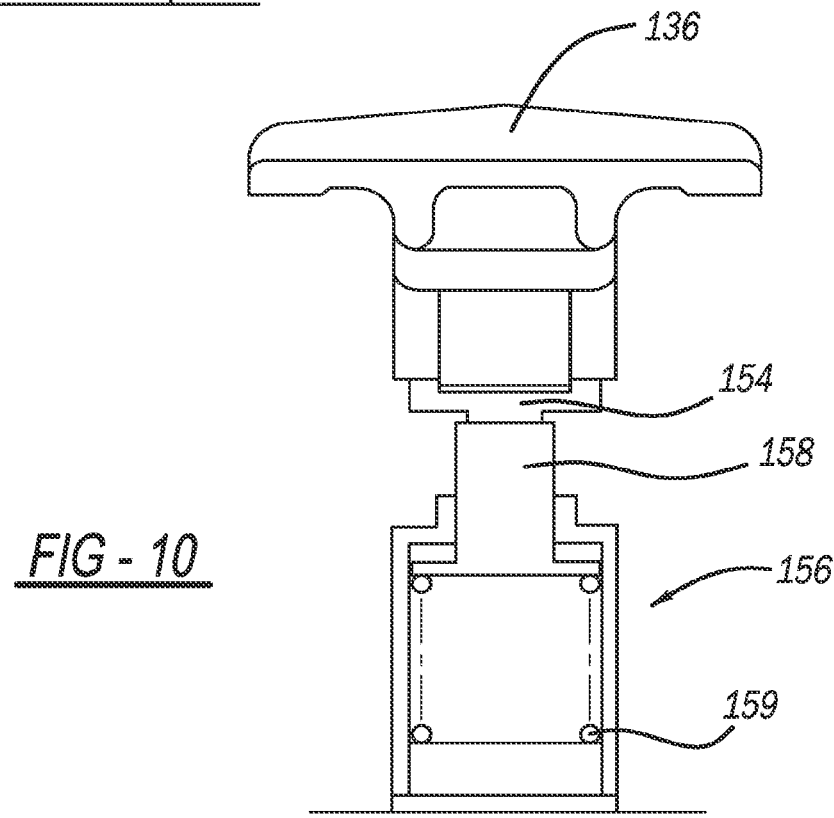
FIG. 10 is a front view of the engine brake rocker arm assembly of FIG. 9.
Figure 11:
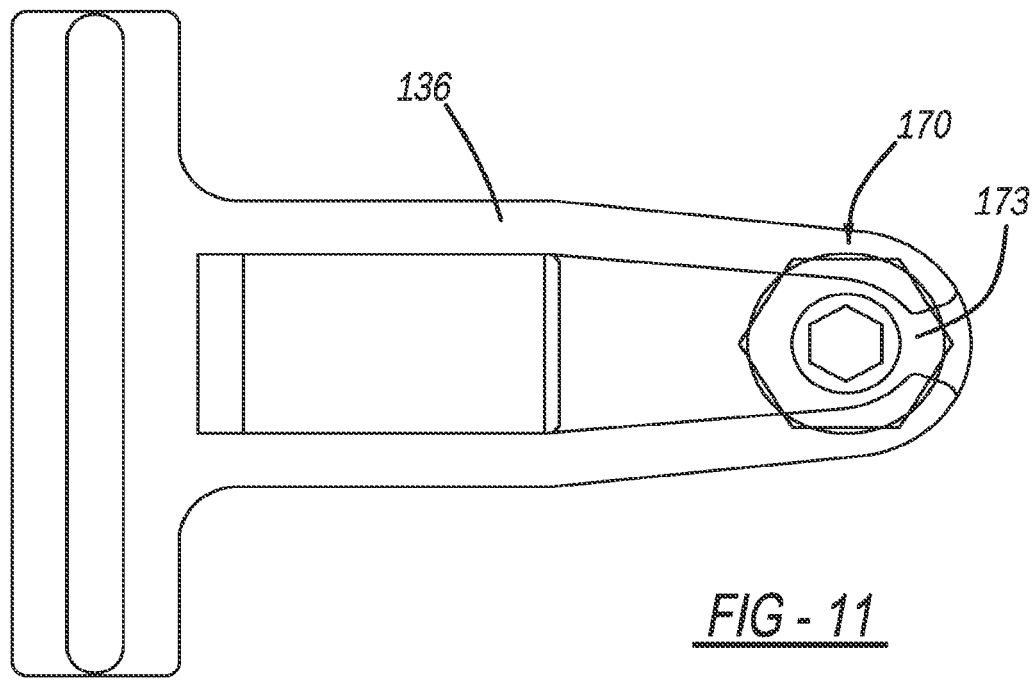
FIG. 11 is a plan view of the engine brake rocker arm assembly of FIG. 9.

As best shown in FIGS. 7 and 9, the exhaust side engine brake rocker arm 136 further includes a foot 154 that engages a lost motion device 156. The lost motion device 156 includes a piston 158 and biasing member 159 that biases the roller 152 against the engine brake cam. The roller 152 can also be a spherical sliding roller bearing. The roller 152 can be used to compensate for inevitable differences and to guarantee low contact stress with the cam and the cylinder roller tire. A second end of the exhaust side engine brake rocker arm 136 engages both second ends of the exhaust rocker arms 132, 134 for concurrently actuating both of the exhaust rocker arms 132, 134. The exhaust side engine brake rocker arm 136 also includes a mechanical lash adjustment feature 170. The mechanical lash adjustment feature 170 can be a treaded bolt 172 and nut 173 (FIG. 9) that allows for mechanical lash adjustment that acts on both of the exhaust rocker arms 132 and 134. In one example, rotation of the nut 173 can translate the threaded bolt 172 upward and downward thereby changing a rotational position of the rocker arm 136 and a resulting positional engagement with both of the exhaust rocker arms 132 and 134 to adjust lash.

The engine brake capsule assembly 150 moves between a first activated position and a second deactivated position. The engine brake capsule 150 is added motion based decompression engine brake. In the activated position, engine braking is active. In the deactivation position, engine braking is not active. In the activated position (FIG. 7), the engine brake capsule assembly 150 is expanded causing rotation of the engine brake arm 136 and opening of the exhaust valves 144 and 148. In the deactivated position (FIG. 8), the engine brake capsule assembly 150 is collapsed and the engine brake arm 136 is not rotated and the engine valves 144 and 148 are not influenced by the engine brake rocker arm 136. The engine brake capsule assembly 150 can move between the expanded and collapsed position by way of an actuator assembly. Further description of the operation of the engine brake capsule assembly 150 may be found in commonly owned PCT Application WO/2019/133658 which is expressly incorporated herein by reference. It will be appreciated that while the instant application has been described as using the engine brake capsule assembly 150, other means may be incorporated for moving the engine brake rocker arm 136 between activated and deactivated positions.

The exhaust valve train assembly 14 further includes an exhaust actuation assembly 174. In the example shown, the exhaust actuation assembly 174 includes a cam assembly 180 having cams 182 and 184 fixed to a camshaft 188 that respectively actuate latch pins 192 and 194. The latch pins 192, 194 move from unactuated positions to actuated positions to preclude and permit expansion of the HLA's 142 and 146. The exhaust actuation assembly 174 can be an electromechanical actuation assembly that is actuated by an actuation device 198. The exhaust actuation assembly 174 can alternatively include an electronic latch (e-latch) having a solenoid on a latch pin coupled to a deactivating lash adjuster as described above.

Figure 3:
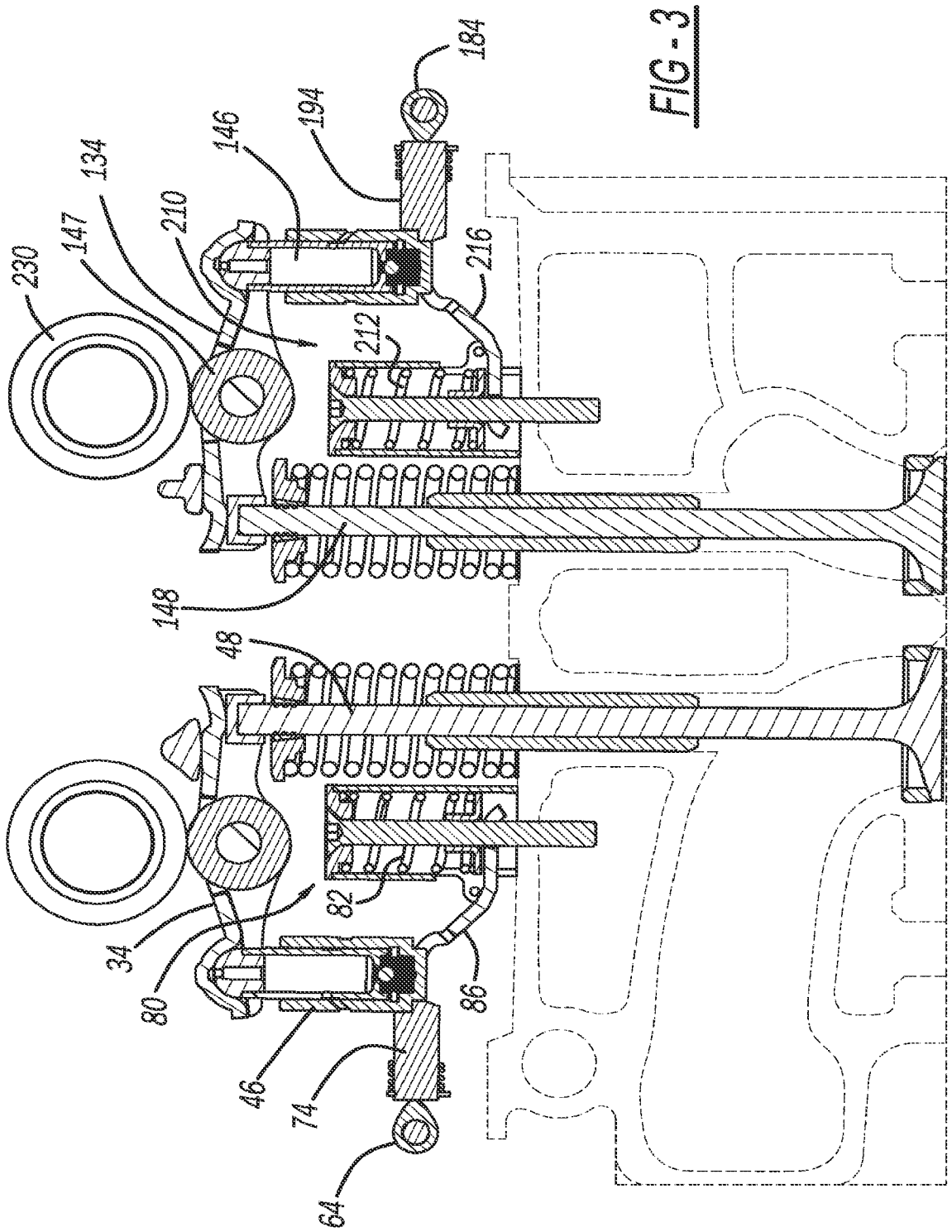
FIG. 3 is a sectional view of the valve train assembly of FIG. 2 taken along lines 3-3 and shown in normal operating mode without cylinder deactivation activated and on base circle.
Figure 4:
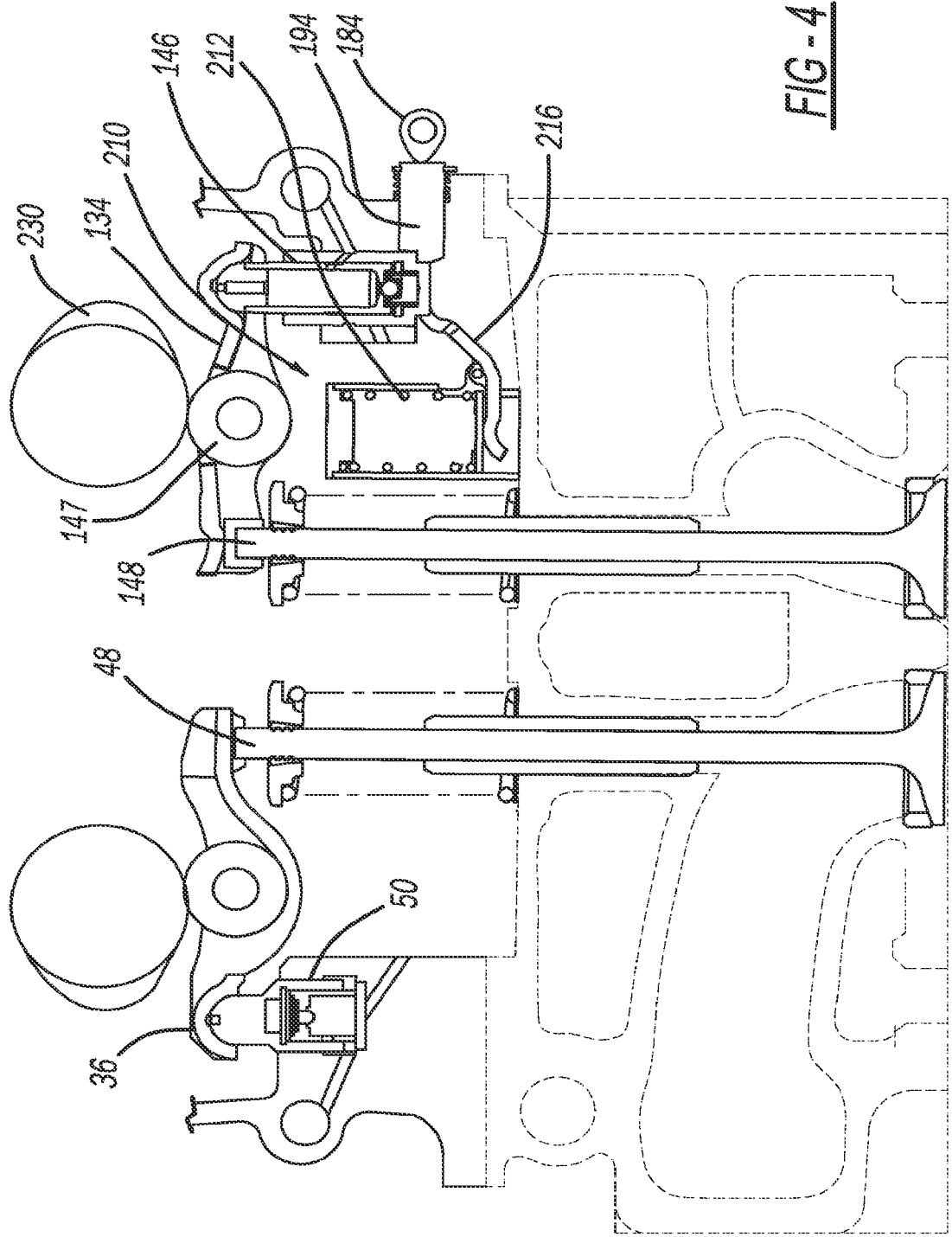
FIG. 4 is a sectional view of the valve train assembly of FIG. 3 and shown in normal operating mode without cylinder deactivation activated and on base circle.
Figure 5:
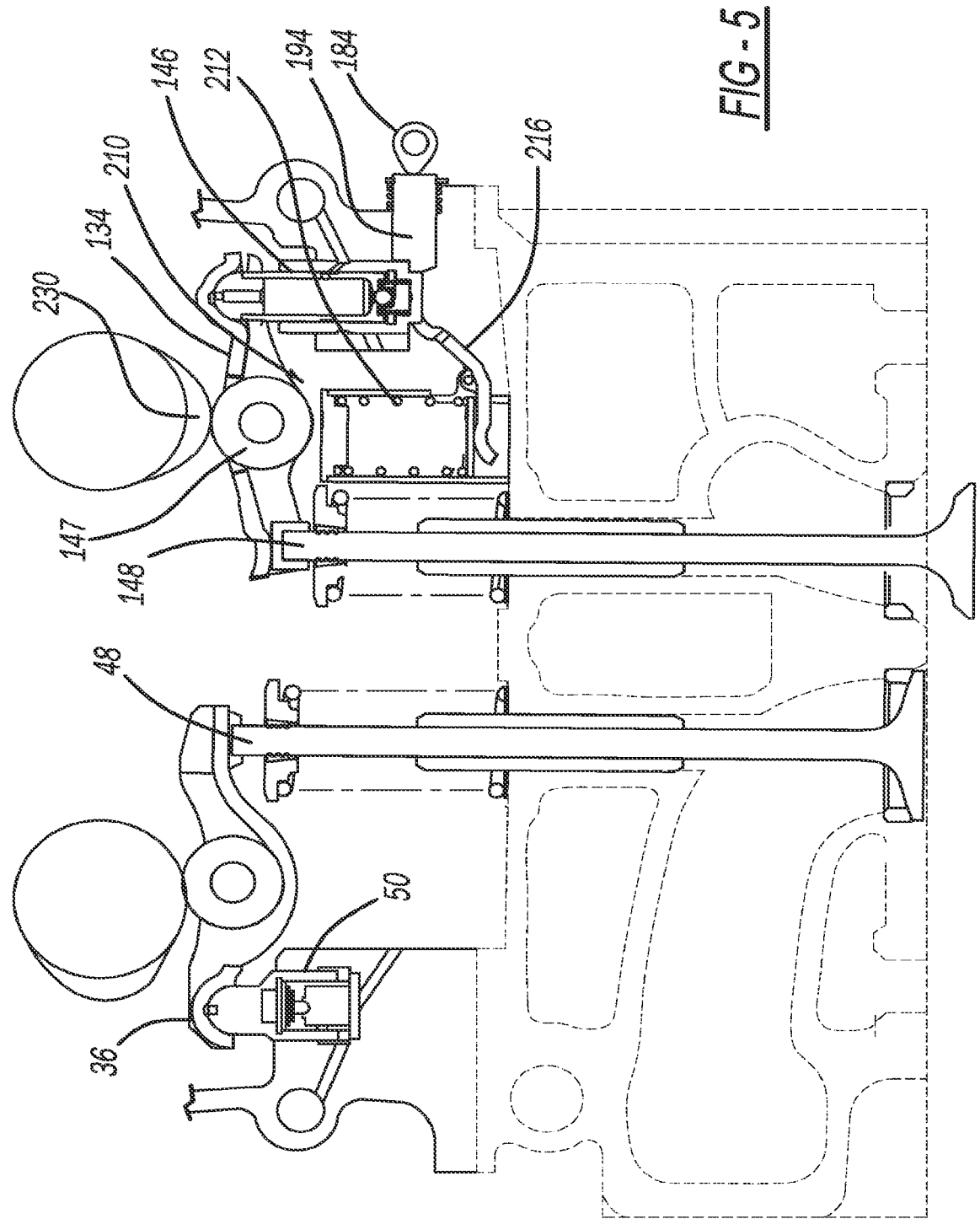
FIG. 5 is a sectional view of the valve train assembly of FIG. 3 and shown in normal operating mode without cylinder deactivation activated and at max lift.

With particular reference now to FIGS. 3-5, a lost motion spring assembly 210 will be described. The lost motion spring assembly 210 includes a biasing member 212 that biases a lever arm 216 that extends generally between the lost motion spring assembly 210 and the HLA 146. When the cam 184 rotates to a position to allow the latch pin 194 to retract, the HLA 146 is permitted to move downwardly thereby rotating the lever arm 216 and compressing the spring 212 of the lost motion spring assembly 210. When a cam 230 rotates it will push the roller 147 associated with the rocker arm 134. Because the latch pin 194 is engaged to the HLA 146, the HLA 146 operates normally to take up lash on the rocker arm 134 while the rocker arm 134 pivots about the HLA 146 and opens the valve 148 (from a closed position shown in FIG. 4 on the base circle, to an open position shown in FIG. 5 at maximum lift). Notably, the lost motion spring assembly 210 remains essentially static between valve closed (FIG. 4) to valve open (FIG. 5). The latch pin 194 takes up the axial load of the HLA 146.

Figure 6:
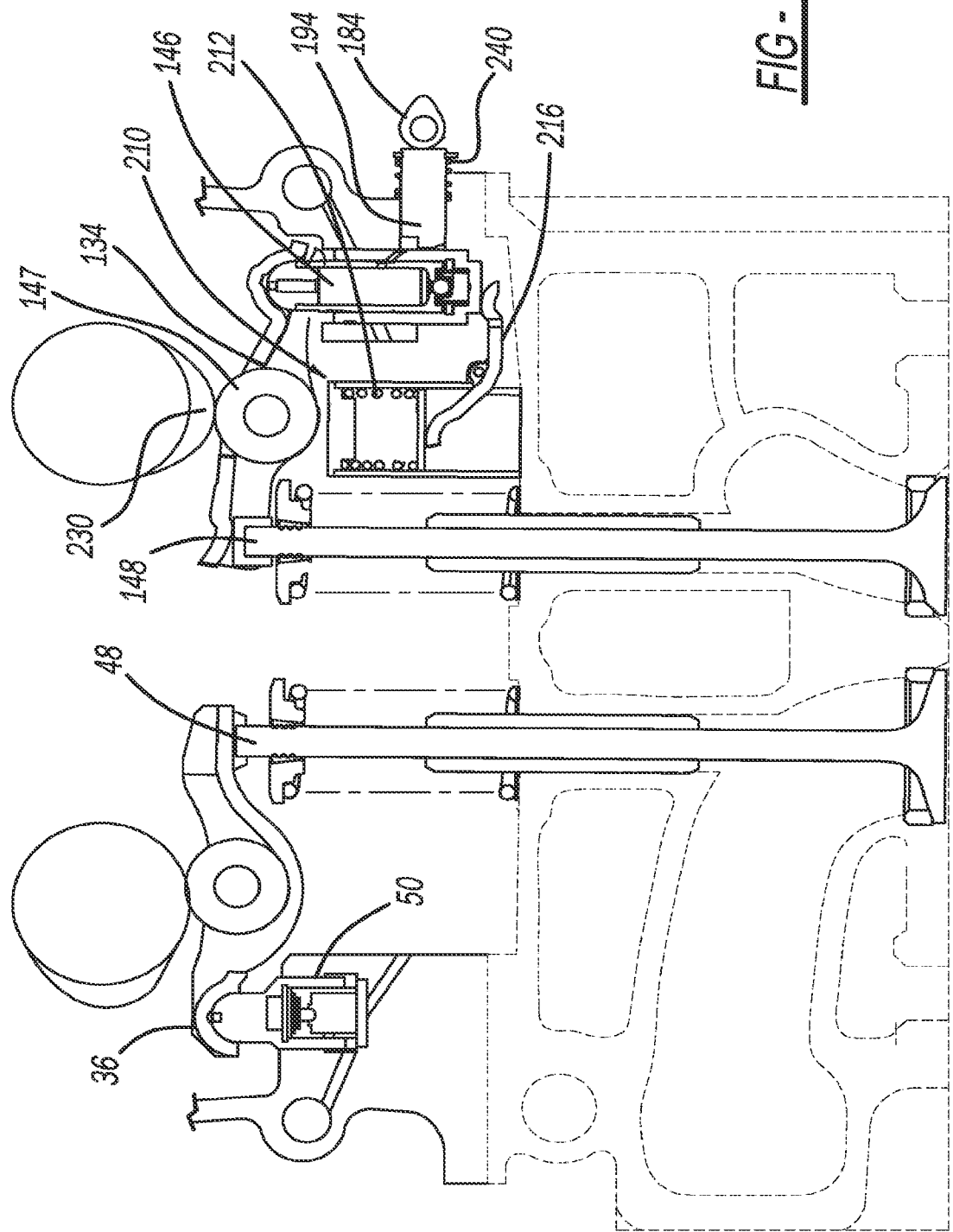
FIG. 6 is a sectional view of the valve train assembly of FIG. 3 and shown during cylinder deactivation and at maximum lift.

With reference now to FIG. 6, the valve train assembly 14 is shown with cylinder deactivation active. When cylinder deactivation is active, the latch pin 194 is translated to a retracted position (rightward in FIG. 6) based on rotation of the cam 184. A latch pin spring 240 urges the latch pin 194 to the retracted position shown in FIG. 6 when the cam 184 is rotated to the position shown in FIG. 6. When the latch pin 194 is in the retracted position, the HLA 194 translates downwardly causing the lever 216 to rotate (clockwise in the example shown) which causes the spring 212 to compress. Explained further, when the cam 230 is at maximum lift with cylinder deactivation active in FIG. 6, the rocker arm 134 no longer rotates about the HLA 146 (like described above with respect to FIG. 5), and instead, the rocker arm 134 collapses the HLA 146 without opening the valve 148. As the cam 230 continues to rotate, the lost motion spring 212 expands causing the lever 216 to rotate back to a position shown in FIG. 3 while returning the HLA 146 back to the position shown in FIG. 3.

While not specifically described herein, it will be appreciated that the rocker arm 132 also communicates with a lost motion spring assembly 220 (FIG. 1B) that provides the same functionality as the lost motion spring assembly 210 but for the rocker arm 132. Moreover, the operation of the latch pin 94 and its interaction with the HLA 146 is also carried out with the latch pins 72, 74 and 76 associated with the cam assembly 60 on the intake actuation assembly 54. In this regard, rotation of the cams 62, 64 and 66 influence translation of the latch pins 72, 74 and 76 into engagement with respective HLA's 42, 46 and 50. The latch pins 72, 74 and 76 move from unactuated positions to actuated positions to preclude and permit expansion of the HLA's 42, 46 and 50. When cylinder deactivation is active, the latch pins 72 and 74 are translated to a retracted position based on rotation of the respective cams 62 and 64. Latch pin springs 250, 252 urge the latch pins 72 and 74, respectively to the retracted position. When the latch pins 72 and 74 are in retracted positions, the HLA's 42 and 46 translate downwardly as described above with respect to the HLA 194. The rocker arms 32 and 34 ultimately collapse the HLA's 42 and 46 without opening the valves 44 and 48 when cylinder deactivation is active.

In one configuration, the latch pin 76 can actuate between activated and deactivated states based on a desire to operate the intake valve train 12 in a Miller cycle. In this regard, the latch pin 76 can move between engaged and disengaged position with the HLA 50 to influence the rocker arm 36 to change a state of the valves 44 and 48 suitable to satisfy Miller cycle. As is known, Miller cycle can be achieved by either closing the intake valves earlier than a normal or Otto Cycle with a shorter than normal intake valve lift duration, or by closing the intake valve later by a longer than normal intake valve lift profile.

Figure 16A:
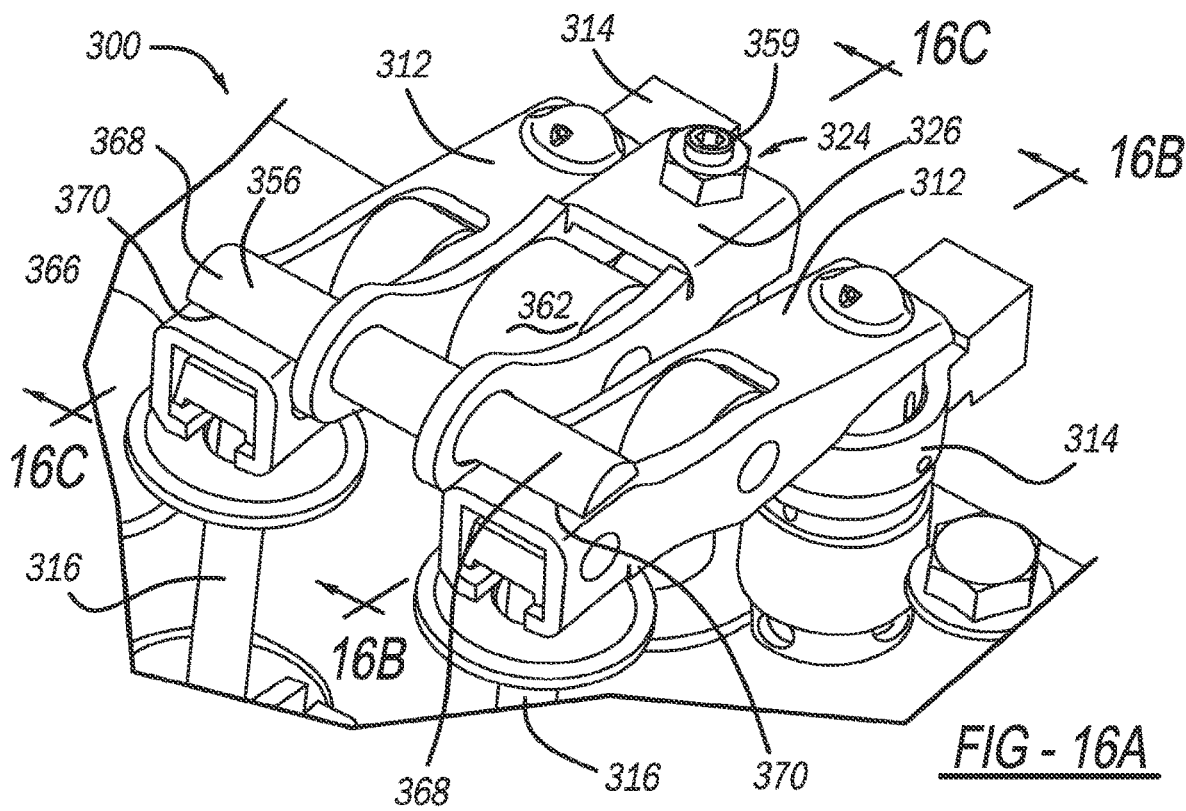
FIG. 16A is a top perspective view of an exhaust valve train assembly constructed in accordance to another example of the present disclosure.
Figure 16B:
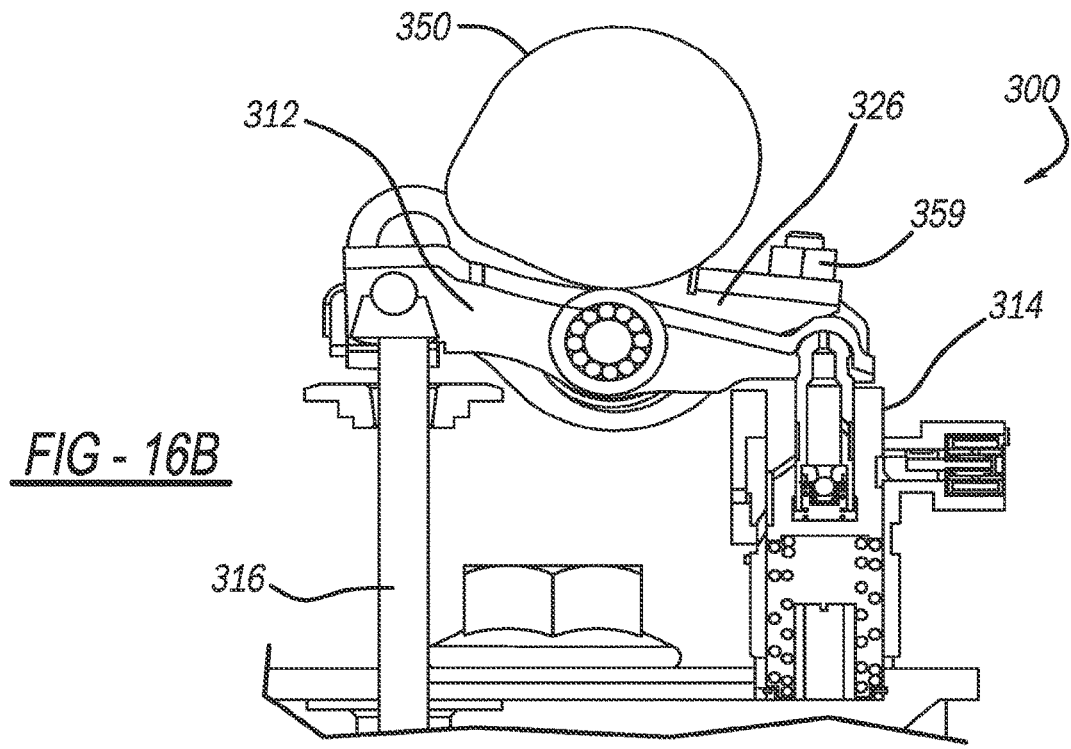
FIG. 16B is a cross-sectional view of the valve train assembly of FIG. 16A taken along lines 16B-16B.
Figure 17:
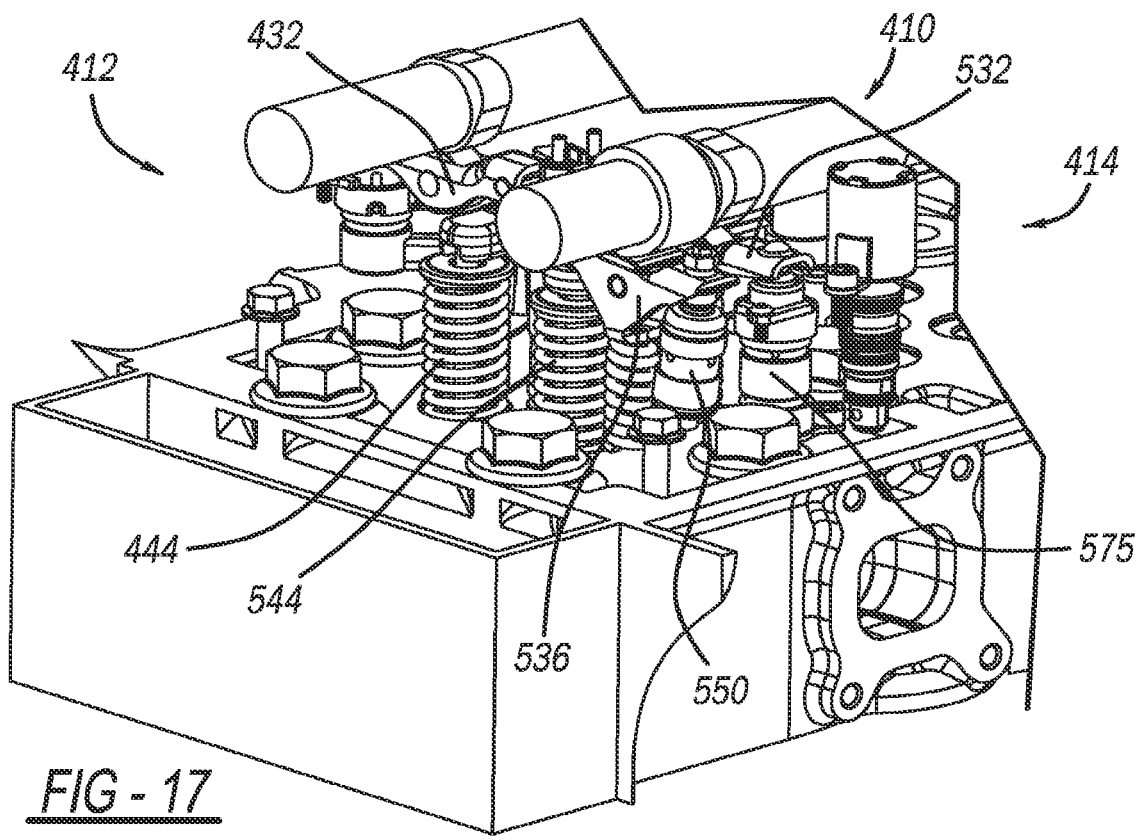
FIG. 17 is a first perspective view of a valve train assembly constructed in accordance to another example of the present disclosure.
Figure 18:
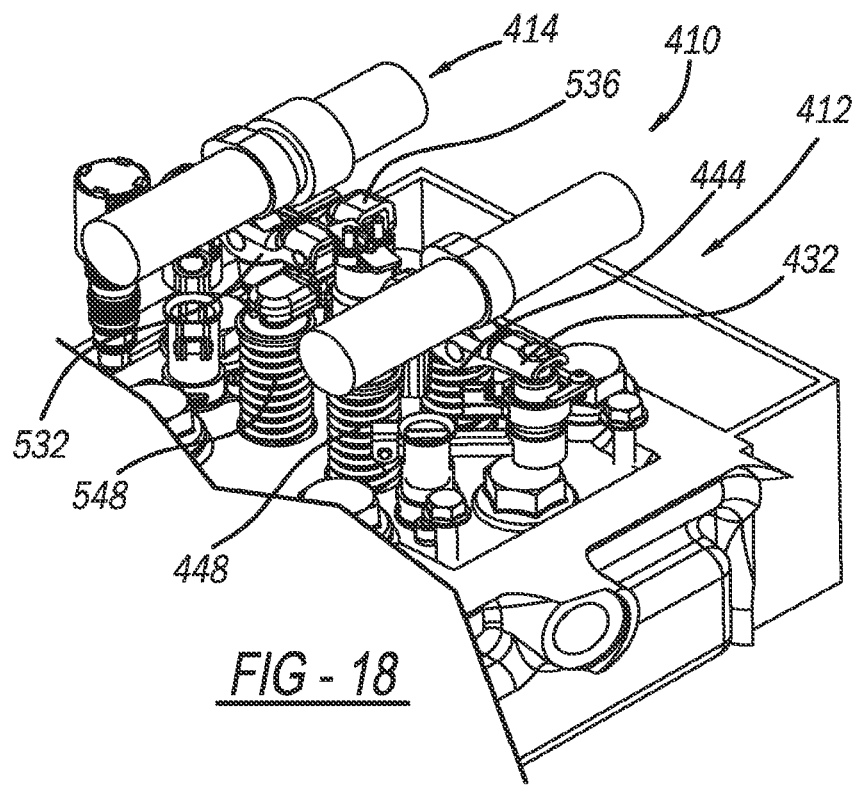
FIG. 18 is a second perspective view of the valve train assembly of FIG. 17.
Figure 19:
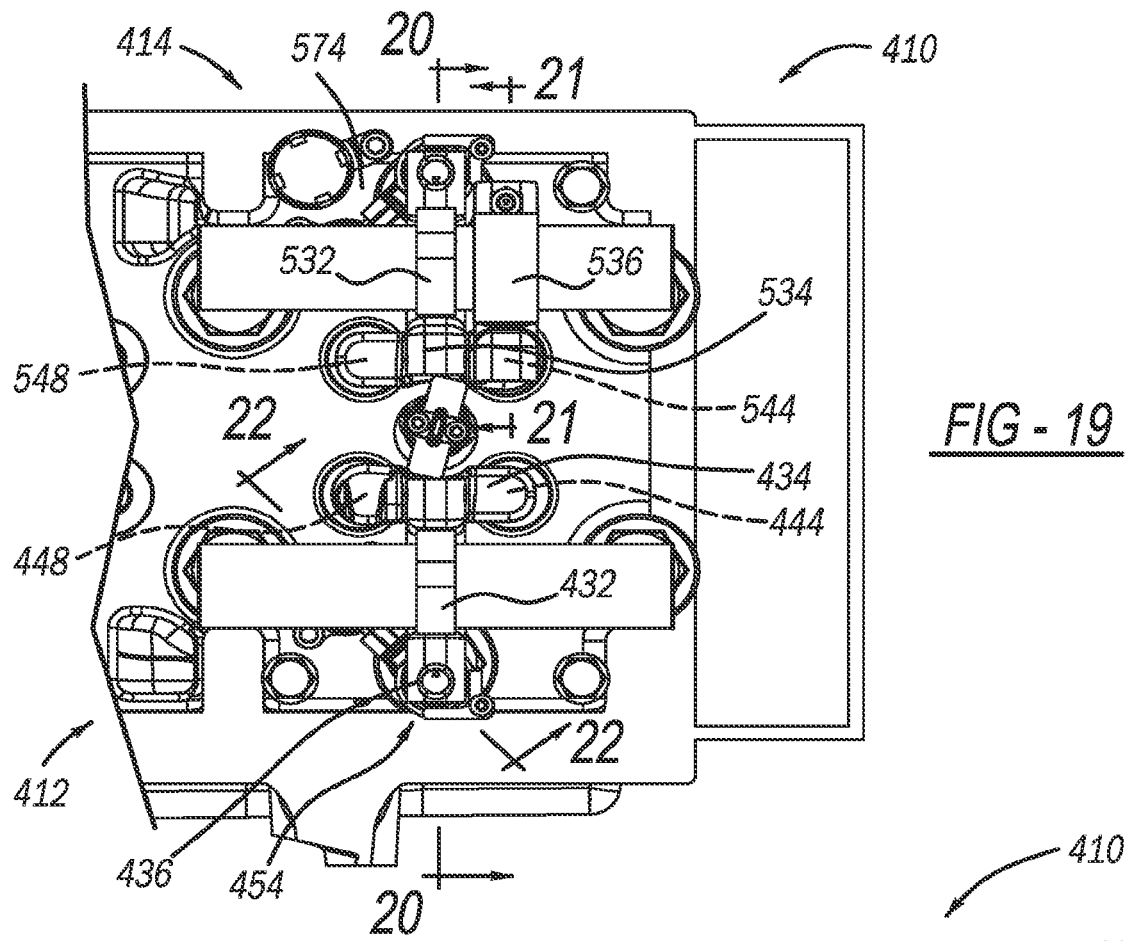
FIG. 19 is a plan view of the valve train assembly of FIG. 17.
Figure 20:
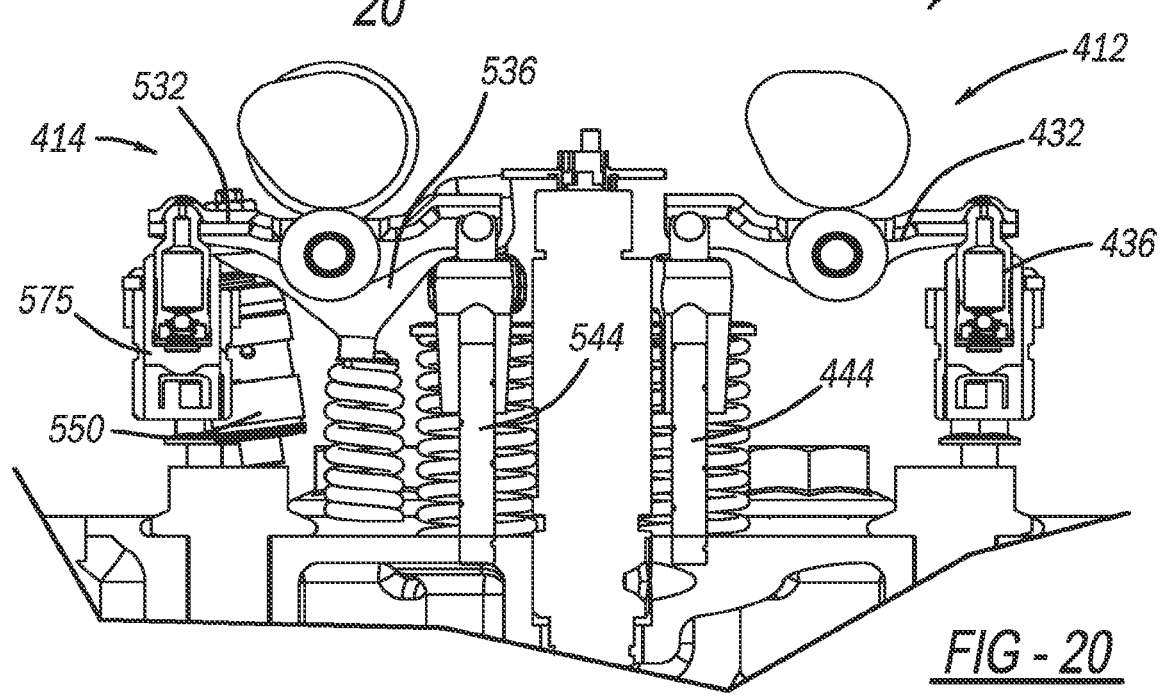
FIG. 20 is a sectional view taken along lines 20-20 of FIG. 19.
Figure 21:
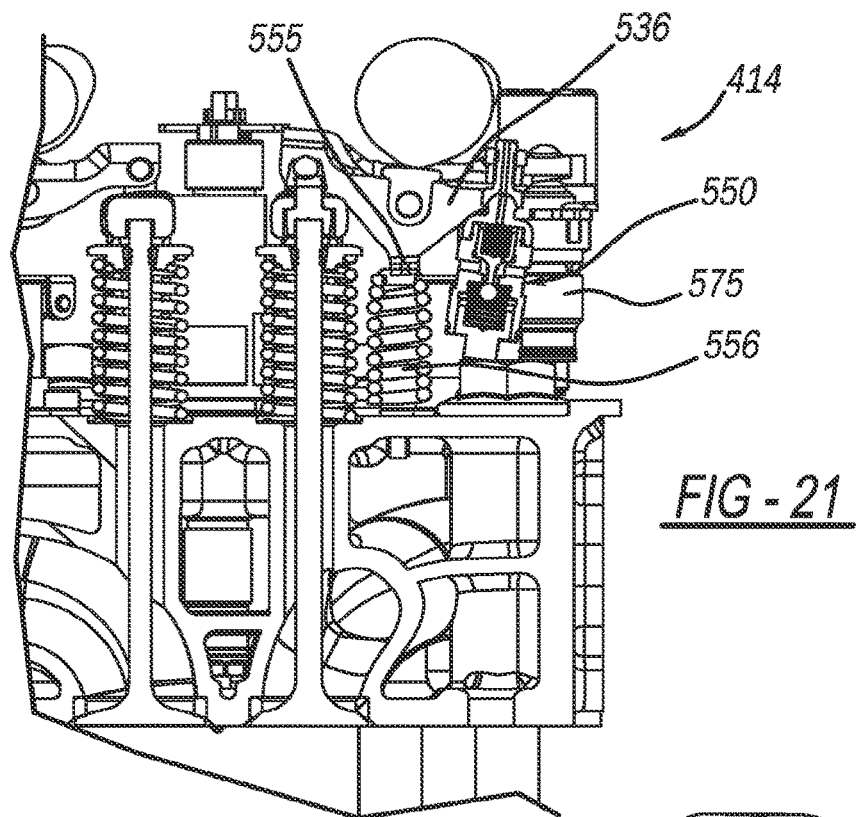
FIG. 21 is a sectional view taken along lines 21-21 of FIG. 19.

With particular reference to FIGS. 16A-16O, a type II valve train arrangement 300 is shown positioned on a cylinder block. It will be appreciated that the present disclosure for the various features described herein may be used in various other arrangements. In this regard, the features described herein associated with the valve train arrangement 300 can be suitable to a wide variety of applications. The valve train arrangement 300 can generally include rocker arms 312 each having a deactivating hydraulic lash adjuster (HLA) capsule 314. The rocker arms 312 may be roller finger followers (RFF). One overhead cam lobe 350 drives each rocker arm 312. A first end of the rocker arm 312 pivots over the deactivating HLA capsule 314, and a second end of the rocker arm 312 actuates a valve 316. The deactivating HLA capsule 314 can be selectively deactivated to prevent actuation of the valve 316.

The valve train arrangement 300 is configured to selectively perform an engine braking operation and includes an engine braking rocker arm assembly 324 including an engine brake rocker arm 326 disposed between the rocker arms 312. In one example, one or more of the rocker arms 312, 326 can be fabricated from a stamped material rather than cast. As illustrated, the engine braking rocker arm assembly 324 can generally include the engine brake rocker arm 326, a capsule assembly 354, and a pin 356. The engine brake rocker arm 326 includes a first end 358, a second end 360, and a roller 362 operatively associated with an overhead cam lobe 364 to drive the engine brake rocker arm 326. The first end 358 can include a lash adjustment pin 359 operatively associated with the capsule assembly 354. In some examples the capsule assembly 354 can be a castellation type deactivating capsule similar to described above.

In the example embodiment, the second end 360 includes a pair of apertures 366 configured to receive the pin 356 therethrough. The pin 356 is able to at least partially rotate within the apertures 366. The pin 356 includes ends 368 each with a flat or substantially flat surface 370 configured to engage an upper surface of one of the rocker arms 312. When the engine brake rocker arm 326 is driven by the overhead cam lobe 364, the second end 360 is rotated downward. As such, the pin 356 engages both rocker arms 312 and imparts the downward movement to the rocker arm 312 to simultaneously actuate the valves 316 to perform the engine braking operation.

Turning now to FIGS. 17-23, a valve train arrangement described in accordance to another example of the present disclosure is shown and generally identified at reference 410. As will become appreciated, the valve train arrangement 410, as with the valve train arrangement 10 above, can offer Type II cylinder deactivation, engine brake and hydraulic lash adjustment. The partial valve train arrangement 410 includes an intake valve train assembly 412 and an exhaust valve train assembly 414. The intake valve train assembly 412 includes an intake rocker arm 432 that acts on a guided bridge 434. The guided bridge 434 extends to open first and second intake valves 444 and 448. A deactivating HLA 436 can be actuated for cylinder deactivation by an intake actuation assembly 454. The intake actuation assembly 454 includes an electronic latch (e-latch) having a latch pin 472. The latch pin 472 moves between an unactuated position to an actuated position to preclude and permit expansion of the HLA 436.

The exhaust valve train assembly 414 includes an exhaust rocker arm 532 and an engine brake rocker arm 536. The exhaust rocker arm 532 acts on a guided bridge 534. The guided bridge 534 extends to open first and second exhaust valves 544 and 548. The engine brake rocker arm 536 includes a foot 554 that engages a lost motion device 556. An engine brake hydraulic capsule 550 can engage an end of the engine brake rocker arm 536 and move between extended and retracted positions depending upon engine brake being activated or deactivated.

Figure 22:
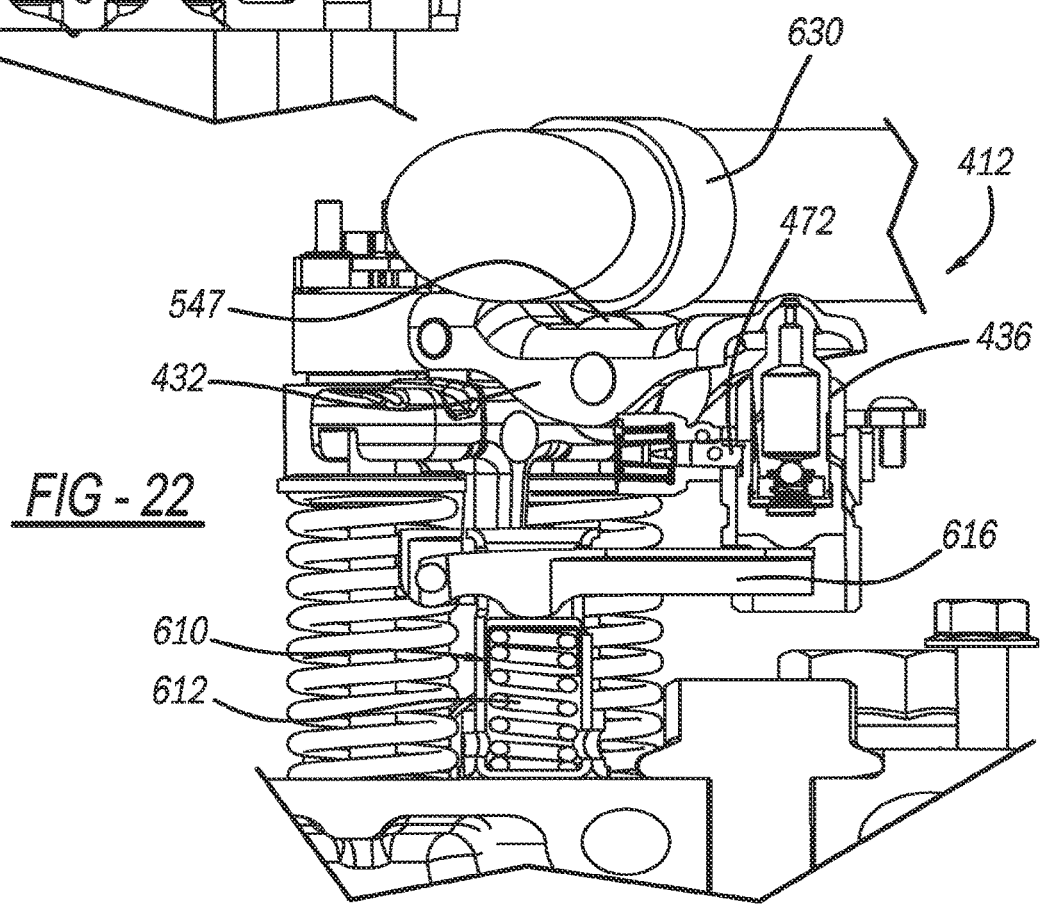
FIG. 22 is a sectional view taken along lines 22-22 of FIG. 19 and shown in normal operating mode without cylinder deactivation activated.

With particular reference now to FIG. 22, a lost motion spring assembly 610 will be described. The lost motion spring assembly 610 includes a biasing member 612 that biases a lever arm 616 that extends generally between the lost motion spring assembly 610 and the HLA 436. When the latch pin 472 is retracted (FIG. 23), the HLA 436 is permitted to move downwardly thereby rotating the lever arm 616 and compressing the spring 612 of the lost motion spring assembly 610. When a cam 630 rotates it will push the roller 547 associated with the rocker arm 432. Because the latch pin 472 is engaged to the HLA 436, the HLA 436 operates normally to take up lash on the rocker arm 432 while the rocker arm 432 pivots about the HLA 436 and opens the valves 444, 448.

Figure 23:
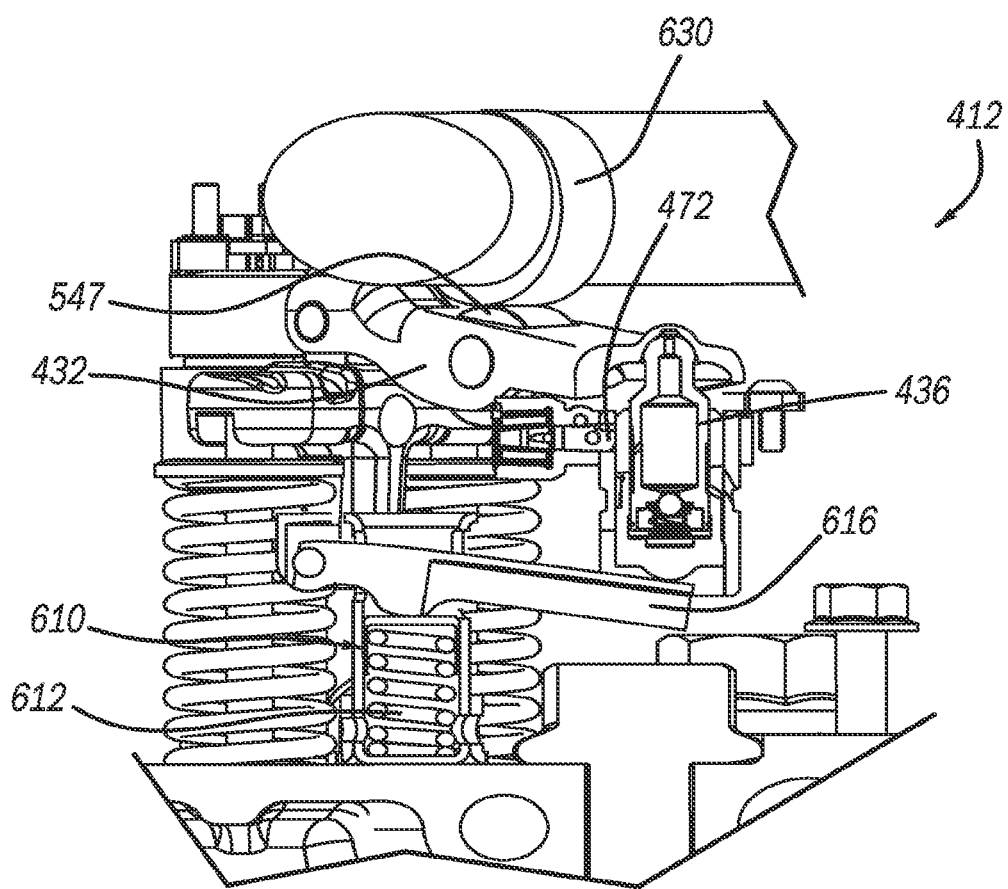
FIG. 23 is the sectional view of FIG. 22 and shown with cylinder deactivation activated.

With reference now to FIG. 23, the valve train assembly 412 is shown with cylinder deactivation active. When cylinder deactivation is active, the latch pin 472 is translated to a retracted position (leftward in FIG. 23) based on a signal sent to the e-latch. When the latch pin 472 is in the retracted position, the HLA 436 translates downwardly causing the lever 216 to rotate (clockwise in the example shown) which causes the spring 612 to compress. Explained further, when the cam 630 is at maximum lift with cylinder deactivation active in FIG. 23, the rocker arm 432 no longer rotates about the HLA 436 (like described above with respect to FIG. 22), and instead, the rocker arm 432 collapses the HLA 436 without opening the valves 444, 448. As the cam 630 continues to rotate, the lost motion spring 612 expands causing the lever 616 to rotate back to a position shown in FIG. 22 while returning the HLA 436 back to the position shown in FIG. 22. As can be appreciated, while the intake actuation assembly 454 has been described, an exhaust actuation assembly 574 is constructed similarly for performing similar function relative to an HLA 575.

The configuration of the valve train assembly 410 shown in FIGS. 17-23 provides reduced hardware content over the valve train assembly 10 above. In particular, one deactivating HLA is needed for each pair of valves by incorporating the respective guided brides. Further, the intake and exhaust actuation assemblies 454 and 574 are implemented having an e-latch (or can be electromechanically actuated) for cylinder deactivation and hydraulic for engine braking.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A type II valve train assembly that selectively opens first and second exhaust valves, the valve train assembly comprising:
   an exhaust rocker assembly comprising:
   a first exhaust rocker arm configured to selectively open the first and second exhaust valves;
   a second exhaust rocker arm configured to selectively open at least one of the first and second exhaust valves during engine braking;
   an exhaust hydraulic lash adjuster (HLA) associated with the first exhaust rocker arm; and
   an exhaust actuation assembly configured to selectively actuate the exhaust HLA so as to switch between an activated state and a deactivated state of cylinder deactivation, and to selectively actuate the second exhaust rocker arm so as to switch between an activated state and a deactivated state of engine braking,
   wherein the switching between the activated state and the deactivated state of cylinder deactivation is controlled independently of the switching between the activated state and the deactivated state of engine braking.

2. The valve train assembly of claim 1, further comprising a valve bridge extending between the first and second exhaust valves, the valve bridge configured to be actuated via the first exhaust rocker arm so as to open the first and second exhaust valves.

3. The valve train assembly of claim 2, wherein the exhaust actuation assembly comprises:
   a latch pin configured to selectively engage the exhaust HLA; and
   a cam configured to rotate so as to influence movement of the latch pin between an extended position and a retracted position.

4. The valve train assembly of claim 3, wherein the exhaust actuation assembly further comprises a lever and a lost motion spring assembly associated with the exhaust HLA, wherein the lost motion spring assembly is configured to compress upon rotation of the lever subsequent to movement of the latch pin to the retracted position.

5. The valve train assembly of claim 1, wherein the exhaust actuation assembly comprises:
   a latch pin configured to selectively engage the exhaust HLA; and
   an electronic latch configured to influence movement of the latch pin between an extended position and a retracted position.

6. The valve train assembly of claim 5, wherein the exhaust actuation assembly further comprises a lever and a lost motion spring assembly associated with the exhaust HLA, wherein the lost motion spring assembly is configured to compress upon rotation of the lever subsequent to movement of the latch pin to the retracted position.

7. The valve train assembly of claim 1, wherein the first and second exhaust rocker arms are formed of stamped metal.

8. The valve train assembly of claim 1, wherein the exhaust rocker assembly further comprises an engine brake exhaust rocker arm including an engine brake capsule assembly, and
   wherein the switching between the activated state and the deactivated state of engine braking includes switching between an expanded position and a collapsed position of the engine brake capsule assembly.

9. The valve train assembly of claim 8, wherein the engine brake capsule assembly influences the engine brake exhaust rocker arm so as to open the first and second exhaust valves when in the expanded position.

* * * * *